(12) United States Patent
Hamasaki et al.

(10) Patent No.: US 8,644,351 B2
(45) Date of Patent: Feb. 4, 2014

(54) NODE DEVICE

(75) Inventors: Motoshi Hamasaki, Kawasaki (JP);
Nobumitsu Ishiwatari, Kawasaki (JP);
Mitsumasa Matsuike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 12/969,662

(22) Filed: Dec. 16, 2010

(65) Prior Publication Data

US 2011/0158120 A1 Jun. 30, 2011

(30) Foreign Application Priority Data

Dec. 28, 2009 (JP) ................................ 2009-296733

(51) Int. Cl.
*H04L 12/28* (2006.01)
*H04J 1/16* (2006.01)

(52) U.S. Cl.
USPC ............ 370/509; 370/252; 370/419; 370/463

(58) Field of Classification Search
USPC .................... 709/89, 248; 375/354–376, 145,
375/240.28, 293, 224; 398/154; 455/13.2,
455/208, 51.1, 260; 714/707, 731, 744;
370/222, 230, 235–236, 245, 254, 301,
370/324, 338, 350, 353, 361, 357, 367, 385,
370/386, 395.5–395.53, 395.62, 403–406,
370/420, 453–454, 457, 460, 463, 901, 902,
370/904, 907, 910, 507–514, 520, 522, 535,
370/516, 503, 252, 419; 327/141, 144, 146,
327/147, 152, 156, 159, 162; 331/11, 18,
331/25, 50, 55–57, 64, 145, 172
See application file for complete search history.

(56) References Cited

U.S. PATENT DOCUMENTS

| 6,512,616 B1 * | 1/2003 | Nishihara ....................... 398/54 |
| 6,618,455 B1 * | 9/2003 | Maeda et al. .................. 375/354 |
| 6,760,346 B1 * | 7/2004 | Suemura et al. .............. 370/504 |
| 6,928,088 B2 * | 8/2005 | Tanonaka et al. ............. 370/503 |
| 7,012,893 B2 * | 3/2006 | Bahadiroglu ................. 370/231 |
| 7,613,212 B1 * | 11/2009 | Raz et al. ....................... 370/510 |
| 7,660,330 B1 * | 2/2010 | Shmilovici .................... 370/503 |

(Continued)

FOREIGN PATENT DOCUMENTS

| JP | 2000-68966 | 3/2000 |
| JP | 2004-15318 | 1/2004 |
| JP | 2006-217359 | 8/2006 |

OTHER PUBLICATIONS

Japanese Office Action mailed Oct. 1, 2013 in corresponding Japanese Application No. 2009-296733.

*Primary Examiner* — John Pezzlo
(74) *Attorney, Agent, or Firm* — Staas & Halsey LLP

(57) ABSTRACT

There is provided a node device having a plurality of transmission lines, included in a network, the node device including a first clock extracting section configured to extract a clock from a first packet used for synchronization of a clock in the node device, the first packet being received from the network through the transmission line, a second clock extracting section configured to extract a clock from a signal received from the network through the transmission line, and a clock selector to select a clock out of the clock extracted by the first clock extracting section and the clock extracted by the second clock extracting section, wherein the clock selected by the clock selector is used for synchronization of a clock in the node device.

10 Claims, 27 Drawing Sheets

(56) References Cited

U.S. PATENT DOCUMENTS

| | | | |
|---|---|---|---|
| 7,965,802 B2* | 6/2011 | Ozawa | 375/355 |
| 8,094,687 B2* | 1/2012 | Cheng et al. | 370/503 |
| 2003/0227566 A1 | 12/2003 | Takenaka | |
| 2011/0110359 A1* | 5/2011 | Cooke et al. | 370/350 |
| 2011/0293023 A1* | 12/2011 | Wu et al. | 375/259 |
| 2012/0301147 A1* | 11/2012 | Zhao et al. | 398/66 |

* cited by examiner

FIG. 7

| clockClass (decimal) | Specification |
|---|---|
| 0 | Reserved |
| 1-5 | Reserved |
| 6 | Shall designate a clock that is synchronized with Master Clock. A clockClass 6 clock shall not be a Slave to another clock in the same domain. |
| 7 | Shall designate a clock that has previously been designated as clockClass 6 but that has stepped out and is in Holdover mode. A clockClass 7 clock shall not be a Slave to another clock in the same domain. |
| 8 | Reserved |
| 9-10 | Reserved |
| 11-12 | Reserved |
| 13 | Shall designate a clock that is synchronized with an application-specific source of time. A clockClass 13 clock shall not be a Slave to another clock in the same domain. |
| 14 | Shall designate a clock that has previously been designated as clockClass 13 but that has stepped out and is in Holdover mode. A clockClass 14 clock shall not be a Slave to another clock in the same domain. |
| 15-51 | Reserved |
| 52 | Alternative A for a clock of clockClass 7 that is not within Holdover specification. A clockClass 52 clock shall not be a Slave to another clock in the same domain. |
| 53-57 | Reserved |
| 58 | Alternative A for a clock of clockClass 14 that is not within Holdover specification. A clockClass 58 clock shall not be a Slave to another clock in the same domain. |
| 59-67 | Reserved |
| 68-122 | For use by other PTP profiles. |
| 123-127 | Reserved |
| 128-132 | Reserved |
| 133-170 | For use by other PTP profiles. |
| 171-186 | Reserved |
| 187 | Alternative B for a clock of clockClass 7 that is not within Holdover specification. A clockClass 187 clock may be a Slave to another clock in the same domain. |
| 188-192 | Reserved |
| 193 | Alternative B for a clock of clockClass 14 that is not within Holdover specification. A clockClass 193 clock may be a Slave to another clock in the same domain. |
| 194-215 | Reserved |
| 216-232 | For use by other PTP profiles. |
| 233-247 | Reserved |
| 248 | Default. This clockClass shall be used if none of the other clockClass definitions apply. |
| 249-250 | Reserved |
| 251 | Reserved |
| 252-254 | Reserved |
| 255 | Shall be the clockClass of a slave-only clock. |

FIG. 8

| NODE NUMBER | PRIORITY GRADE 1 | PRIORITY GRADE 2 |
|---|---|---|
| NODE N21 | Master Clock | Internal |
| NODE N22 | Sync-E (1) | Sync-E (4) |
| NODE N23 | Sync-E (2) | PTP (3) |
| NODE N24 | NON-CORRESPONDENCE | NON-CORRESPONDENCE |

FIG. 10

| 8 BYTES | 6 BYTES | 6 BYTES | 2 BYTES | 46 TO 1500 BYTES | 4 BYTES |
|---|---|---|---|---|---|
| PREAMBLE/ SFD | ADDRESS OF DESTINATION | ADDRESS OF SEND SOURCE | Type = 88F7 | PTP PACKET | FCS |

FIG. 11

| Bits | | | | | | | | Octets | Offset |
|---|---|---|---|---|---|---|---|---|---|
| 7 | 6 | 5 | 4 | 3 | 2 | 1 | 0 | | |
| transportSpecific | | | | messageType | | | | 1 | 0 |
| reserved | | | | versionPTP | | | | 1 | 1 |
| messageLength | | | | | | | | 2 | 2 |
| domainNumber | | | | | | | | 1 | 4 |
| reserved | | | | | | | | 1 | 5 |
| flagField | | | | | | | | 2 | 6 |
| correctionField | | | | | | | | 8 | 8 |
| reserved | | | | | | | | 4 | 16 |
| sourcePortIdentity | | | | | | | | 10 | 20 |
| sequenceId | | | | | | | | 2 | 30 |
| controlField | | | | | | | | 1 | 32 |
| logMessageInterval | | | | | | | | 1 | 33 |

FIG. 12A

| Bits | | | | | | | | Octet | Offset |
|---|---|---|---|---|---|---|---|---|---|
| 7 | 6 | 5 | 4 | 3 | 2 | 1 | 0 | | |
| Common message header | | | | | | | | 34 | 0 |
| originTimestamp | | | | | | | | 10 | 34 |

FIG. 12B

| Bits | | | | | | | | Octet | Offset |
|---|---|---|---|---|---|---|---|---|---|
| 7 | 6 | 5 | 4 | 3 | 2 | 1 | 0 | | |
| Common message header | | | | | | | | 34 | 0 |
| preciseOriginTimestamp | | | | | | | | 10 | 34 |

FIG. 12C

| Bits | | | | | | | | Octet | Offset |
|---|---|---|---|---|---|---|---|---|---|
| 7 | 6 | 5 | 4 | 3 | 2 | 1 | 0 | | |
| Common message header | | | | | | | | 34 | 0 |
| receiveTimestamp | | | | | | | | 10 | 34 |
| requestingPortIdentity | | | | | | | | 10 | 44 |

FIG. 12D

| Bits | | | | | | | | Octet | Offset |
|---|---|---|---|---|---|---|---|---|---|
| 7 | 6 | 5 | 4 | 3 | 2 | 1 | 0 | | |
| Common message header | | | | | | | | 34 | 0 |
| originTimestamp | | | | | | | | 10 | 34 |
| currentUtcOffset | | | | | | | | 2 | 44 |
| reserved | | | | | | | | 1 | 46 |
| grandmasterPriority1 | | | | | | | | 1 | 47 |
| grandmasterClockQuality | | | | | | | | 4 | 48 |
| grandmasterPriority2 | | | | | | | | 1 | 52 |
| grandmasterIdentity | | | | | | | | 8 | 53 |
| stepsRemoved | | | | | | | | 2 | 61 |
| timeSource | | | | | | | | 1 | 63 |

FIG. 15

| SSM (Binary) | SSM description | PTP clockClass |
|---|---|---|
| 0 0 0 0 | Quality unknown | |
| 0 0 0 1 | Reserved | |
| 0 0 1 0 | ITU-T Rec. G.811 | |
| 0 0 1 1 | Reserved | |
| 0 1 0 0 | SSU-A | 6 |
| 0 1 0 1 | Reserved | |
| 0 1 1 0 | Reserved | |
| 0 1 1 1 | Reserved | |
| 1 0 0 0 | SSU-B | 13 |
| 1 0 0 1 | Reserved | |
| 1 0 1 0 | QL-EEC2 (QL-ST3) | |
| 1 0 1 1 | ITU-T Rec. G.813 Option I (SEC) QL-EEC1 (QL-SEC) | 52, 58, 187, 193, 248, 255 |
| 1 1 0 0 | Reserved | |
| 1 1 0 1 | Reserved | |
| 1 1 1 0 | Reserved | |
| 1 1 1 1 | Do not use for synchronization | 0-5, 7, 8-12, 14, 15-51, 53-57, 59-186, 188-192, 194-247, 249-254 |

FIG. 23

| SSM (Binary) | | | | SSM description | PTP clockClass |
|---|---|---|---|---|---|
| 0 | 0 | 0 | 0 | Quality unknown | |
| 0 | 0 | 0 | 1 | Reserved | |
| 0 | 0 | 1 | 0 | ITU-T Rec. G.811 | |
| 0 | 0 | 1 | 1 | PTP(primary reference time source) | 6 |
| 0 | 1 | 0 | 0 | SSU-A | |
| 0 | 1 | 0 | 1 | PTP(application-specific source of time) | 13 |
| 0 | 1 | 1 | 0 | PTP(Degradation alternative A) | 52, 58 |
| 0 | 1 | 1 | 1 | PTP(Degradation alternative B) | 187, 193 |
| 1 | 0 | 0 | 0 | SSU-B | |
| 1 | 0 | 0 | 1 | PTP(Default or slave only) | 248, 255 |
| 1 | 0 | 1 | 0 | QL-EEC2 (QL-ST3) | |
| 1 | 0 | 1 | 1 | ITU-T Rec. G.813 Option I (SEC) QL-EEC1 (QL-SEC) | |
| 1 | 1 | 0 | 0 | Reserved | |
| 1 | 1 | 0 | 1 | Reserved | |
| 1 | 1 | 1 | 0 | Reserved | |
| 1 | 1 | 1 | 1 | Do not use for synchronization | 0-5, 7, 8-12, 14, 15-51, 53-57, 59-186, 188-192, 194-247, 249-254 |

FIG. 24

| ORDER OR PRIORITY | SSM (Binary) | SSM description |
|---|---|---|
| 1 | 0 0 1 0 | ITU-T Rec. G.811 |
| 2 | 0 0 1 1 | PTP(primary reference time source) |
| 3 | 0 1 0 0 | SSU-A |
| 4 | 0 1 0 1 | PTP(application-specific source of time) |
| 5 | 0 1 1 0 | PTP(Degradation alternative A) |
| 6 | 0 1 1 1 | PTP(Degradation alternative B) |
| 7 | 1 0 0 0 | SSU-B |
| 8 | 1 0 0 1 | PTP(Default or slave only) |
| 9 | 1 0 1 1 | ITU-T Rec. G.813 Option I (SEC) QL-EEC1 (QL-SEC) |
| 10 | 1 0 1 0 | QL-EEC2 (QL-ST3) |
| 11 | 1 1 1 1 | Do not use for synchronization |

NODE DEVICE

CROSS-REFERENCE TO RELATED APPLICATION

This application is based upon and claims the benefit of priority of the prior Japanese Patent Application No. 2009-296733, filed on Dec. 28, 2009, the entire contents of which are incorporated herein by reference.

FIELD

The embodiments discussed herein are related to a node device included in a network.

BACKGROUND

As typical techniques for attaining synchronization in a LAN network, for example, such as Ethernet or the like, a method (hereinafter, referred to as a Sync-E (Synchronous Ethernet)) which is provided in ITU-T G. 8261 and is of the type that synchronization is attained using a clock which is extracted from a transmission line and a method (hereinafter, referred to as PTP (Precision Time Protocol)) which is provided in IEEE 1588 and is of the type that synchronization is attained by setting time on a packet-by-packet basis are proposed.

FIG. 1 is a diagram illustrating an example of a configuration of a network which is configured to attain clock-synchronization by the Sync-E method. In the above mentioned clock-synchronization, a master clock 10, for example, such as, a GPS (Global Positioning System) clock is supplied to a node N1 and the node N1 synchronizes a synchronous signal (such as a 2-MHz or 2-Mbps signal) used to generate a clock with the master clock 10. Each of nodes N2 and N4 arranged adjacent to the node N1 extracts a clock from a transmission line through which it is connected with the node N1 to attain synchronization. In realizing synchronization in the above mentioned manner, each of the nodes N2 and N4 sends clock quality information to another node and receives the clock quality information from another node using an ESMC (Ethernet Synchronization Messaging Channel) packet for transmission of the clock quality. Likewise, a node N3 extracts clocks from transmission lines through which it is connected with the adjacent nodes N2 and N4. In the above mentioned case, the node N3 selects one of the clocks sent from the node N2 and the node N4 in accordance with the grade of priority which is determined by taking the clock quality into consideration and defines the selected clock as a device clock.

FIG. 2 is a block diagram illustrating an example of a Sync-E correspondence node device (a node device configured to attain synchronization by the Sync-E method). Each of receiving interfaces 11a to 11c extracts a clock and an ESMC packet from a signal which has been received from a transmission line by using a clock recovering function of each PHY section and the reception clocks and the ESMC packets which have been extracted using the respective receiving interfaces 11a to 11c are collected and sent to a clock functioning section 12. An SSM (Synchronization Status Message) which is quality information is extracted from each ESMC packet by using a Sync-E processor 13 included in the clock functioning section 12, the SSM of high quality is selected from within the extracted SSMs by using an SSM selector 14, and a reception clock corresponding to the high-quality SSM is selected from within the reception clocks by using a selector 15. The selected clock is subjected to clock-synchronization using a PLL (Phase locked loop) 16 and is distributed to respective PHY sections of transmitting interfaces 19a to 19c by using a clock distributing section 17. In the above mentioned case, it may become possible to maintain an operating frequency by operating a holdover circuit 18 which is configured to maintain a clock frequency simultaneously with clock distribution even when any clock is not received.

FIG. 3 is a diagram illustrating an example of a configuration of a network which is configured to attain clock-synchronization by the PTP method. In the PTP method, such a time-synchronizing method is adopted that the time on the side of a master is used as a reference and the time on the side of a slave is set to the reference time. A delay in transmission generated between the master and the slave is also calculated and corrected to realize accurate time-based synchronization.

First, a node N11 receives time information from a grand master clock 20 (such as a GPS clock or the like) which is a source of a time with which a time of another node is synchronized in the PTP method to attain time-synchronization. The node N11 sends a PTP packet to each of nodes N12 and N14. As a result, the nodes N12 and N14 are time-synchronized with the node N11. Then, the nodes N12 and N14 send PTP packets to a node N13. The node N13 selects one of the nodes N12 and N14 using a best master clock algorithm (for example, the node N12 is selected). As a result, the node N13 is time-synchronized with the node N12 and time-synchronization of all the nodes is attained.

FIG. 4 is a block diagram illustrating an example of a configuration of a PTP correspondence node device (a node device configured to attain synchronization by the PTP method). Receiving interfaces 21a to 21c respectively detect PTP packets to generate reception times and send the reception time information and the PTP packets to a PTP reception processor 23 which is included in a clock functioning section 22 and performs a protocol analyzing process on the PTP packets. The PTP packets which have been subjected to reception processing using the PTP reception processor 23 are sent to a best master clock algorithm section 24 and the packet of highest quality is selected from within the PTP packets by using the master clock algorithm section 24 and the time of an in-device clock 25 is set to a reception time at which the selected PTP packet has been received. A PTP clock extracting section 27 obtains a difference in time information between PTP packets which are sent thereto at a fixed time and feedbacks information on the obtained difference to the in-device clock 25 included therein to output a clock which is in synchronization with the clock of a source from which the PTP packet concerned has been sent. Then, a PTP packet to be sent is generated by using a PTP transmission processor 26 on the basis of time information from the in-device clock 25 having the time of which has been set in the above mentioned manner. A PTP packet is sent from the PTP transmission processor 26 and is inserted into respective transmitting interfaces 29a to 29c and a time stamp is embedded in the packet as a transmission time.

Incidentally, NTP (Network Time Protocol) which is provided in RFC 1305 and is supplied from a terminal 30 to the in-device clock 25 indicates a time-synchronization method which is performed on the basis of the NTP and is lower in accuracy than the time-synchronization attained the PTP method as a backup time-synchronization method which will be used in the case where utilization of a PTP packet is difficult.

Incidentally, a technique for selectively switching and outputting a plurality of clock signals including clock signals which have been received and extracted using a sending/receiving section and clock signals which have been sent from external clock signal sources using a clock switching section on the basis of quality information which is transferred together with each clock signal is proposed as disclosed, for example, in Japanese Laid-open Patent Publication No. 2000-68966.

SUMMARY

According to an aspect of the embodiment, there is provided a node device having a plurality of transmission lines, included in a network, the node device including a first clock extracting section configured to extract a clock from a first packet used for synchronization of a clock in the node device, the first packet being received from the network through the transmission line, a second clock extracting section configured to extract a clock from a signal received from the network through the transmission line, and a clock selector to select a clock out of the clock extracted by the first clock extracting section and the clock extracted by the second clock extracting section, wherein the clock selected by the clock selector is used for synchronization of a clock in the node device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of PTP parameter and clock classes;

FIG. 8 is a diagram illustrating an example of a list of grades of priority allocated to clock sources of respective nodes;

FIG. 10 is a diagram illustrating an example of formats of PTP frames of a PTP packet;

FIG. 11 is a diagram illustrating an example of configurations of headers commonly used by PTP packets.

FIGS. 12A-12D are diagrams illustrating an example of one of formats of various messages;

FIG. 15 is a diagram illustrating an example of a table in which PTP clock qualities and SSMs are registered in one-to-one correspondence;

FIG. 23 is a diagram illustrating an example of a table in which PTP clock qualities and SSMs are registered in one-to-one correspondence;

FIG. 24 is a diagram illustration an example of a relation between each SSM value and each order of priority;

DESCRIPTION OF EMBODIMENTS

In order to realize clock-synchronization among node devices having the Sync-E function to extract a clock signal from a transmission line in a network, it may be desirable that all the node devices included in the network have the Sync-E function. The reason therefore lies in that in the case where a Sync-E non-correspondence node N4a (a node N4a having no Sync-E function) is present in the network as illustrated in FIG. 5, it may become difficult to extract a clock signal from a transmission line.

Figure 1:
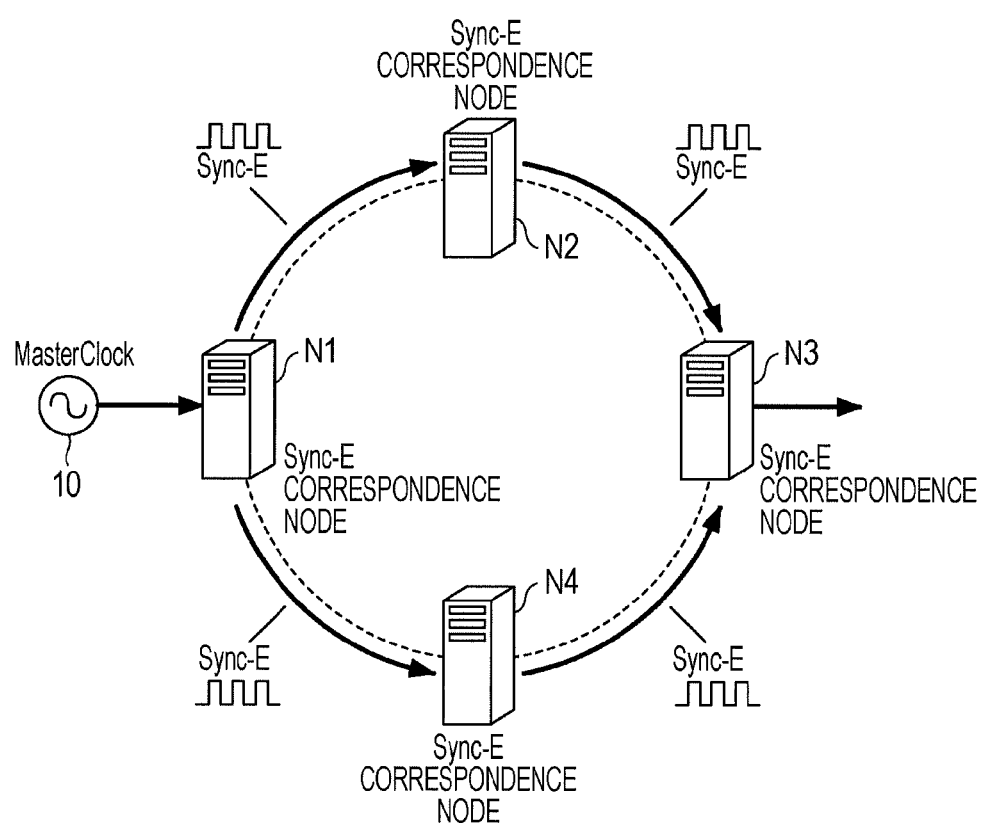
FIG. 1 is a diagram illustrating an example of a network of the type to attain clock-synchronization by the Sync-E method.
Figure 2:
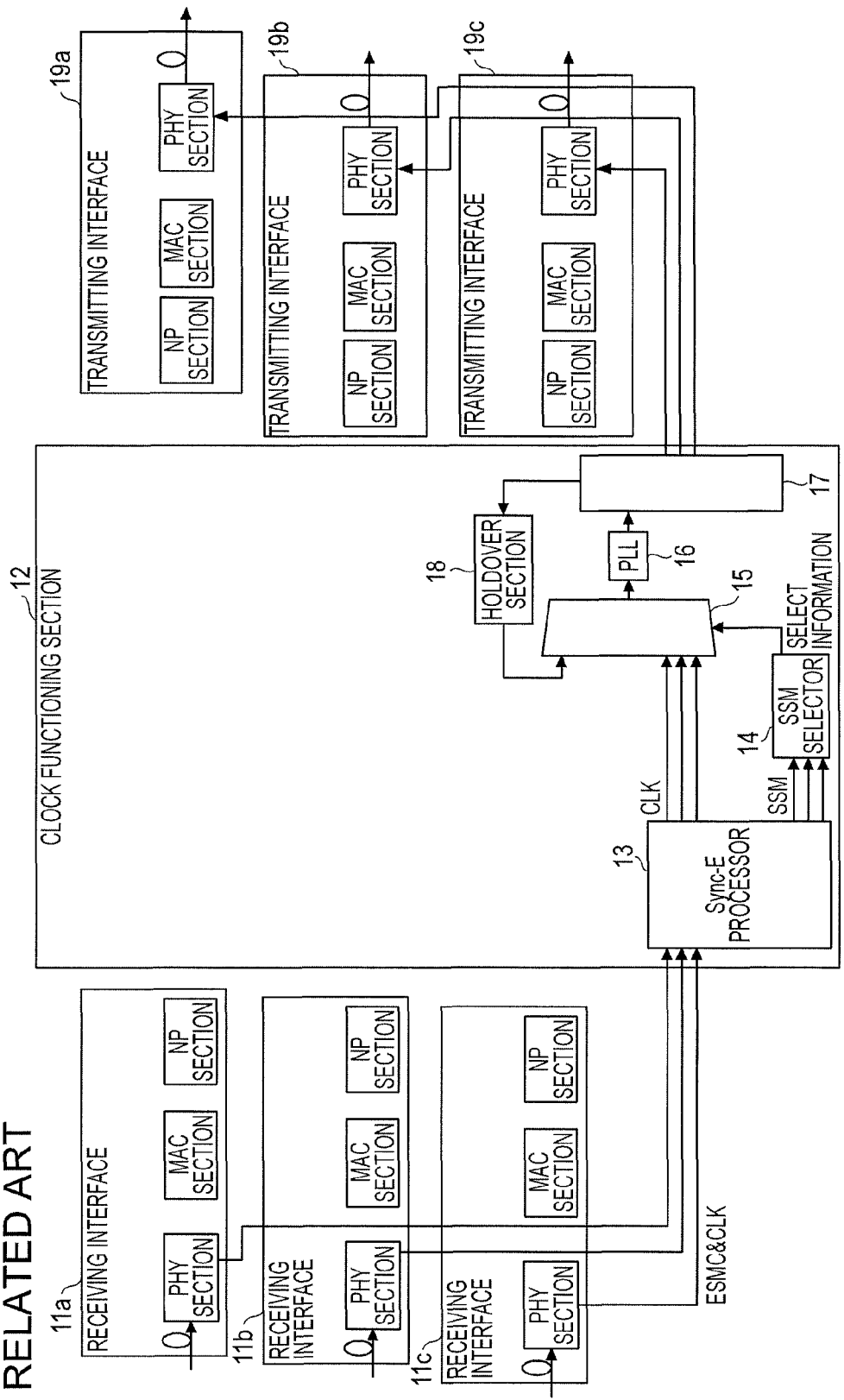
FIG. 2 is a block diagram illustrating an example of a Synch-E correspondence node device.
Figure 3:
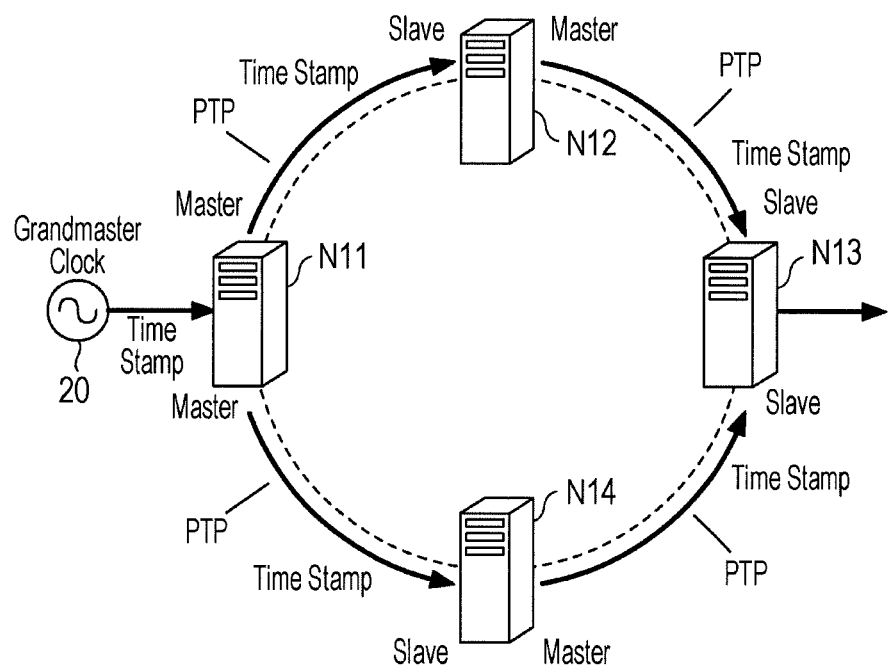
FIG. 3 is a diagram illustrating an example of a configuration of a network of the type to attain clock-synchronization by the PTP method.
Figure 4:
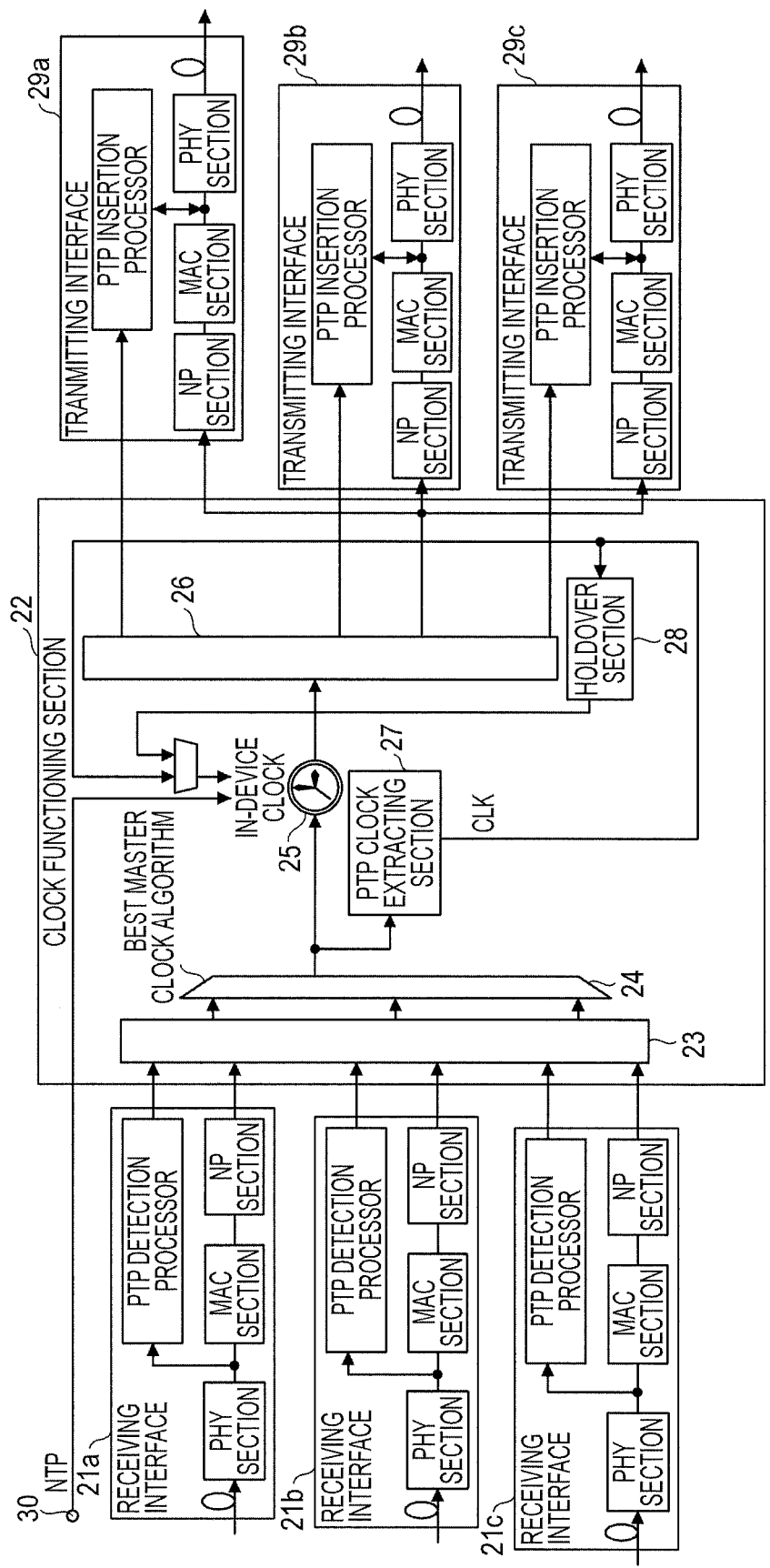
FIG. 4 is a block diagram illustrating an example of a PTP correspondence node device.
Figure 5:
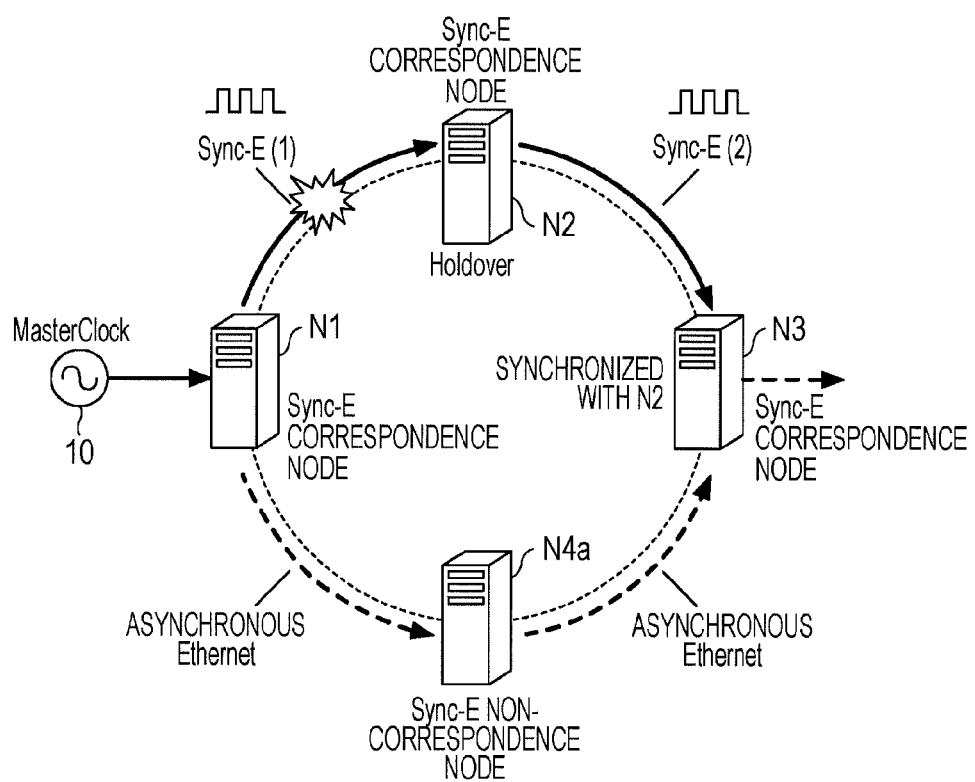
FIG. 5 is a diagram illustrating an example of a configuration of a network including a Sync-E non-correspondence node.

In the example illustrated in FIG. 5, in a normal state, clock synchronization may be attained with clocks which have been extracted from transmission lines along the route from a master clock 10, through nodes N1 and N2, to a node N3 using the Sync-E function. The node N1 is synchronized with the node N2 with a transmission line clock which is extracted from a transmission line Sync-E (1) and the node N2 is synchronized with the node N3 with a transmission line clock which is extracted from a transmission line Sync-E (2). In the above mentioned situation, in the case where a fault (for example, disconnection of the transmission line or the like) has occurred in the transmission line Sync-E (1) between the nodes N1 and N2, it may become difficult for the node N2 to extract a clock which is sent from the node N1. In addition, it may become also difficult for the node N2 to select a transmission line clock sent from the node N3 under the influence of a timing loop preventing function of the Sync-E function. The above mentioned timing loop preventing function is a function for forcibly making it difficult to select a clock concerned by bringing an SSM (Synchronization Status Message) into a DNU (Do Not Use) state in a direction in which the clock is to be selected. That is, when this function works, it may become difficult for the node N2 to attain clock-synchronization and the node N2 may enter a holdover state. Therefore, the node N3 is pulled out of synchronization which is performed on the basis of the master clock 10.

That is, the network illustrated in FIG. 5 may become unsuitable to cope with a fault as mentioned above from the viewpoint of its function serving as a synchronous network. In addition, even in the case where a function of extracting a clock from a packet which is sent through a PTP (Precision Time Protocol) type transmission line is given to the above mentioned network in addition to the function of extracting a clock from a transmission line, such a case generates that it may be difficult to handle the clock quality of a clock obtained from the PTP type transmission line directly as the clock quality of a clock obtained from a Sync-E type transmission line.

In addition, under present conditions, an internal oscillator used to count up the time in the device is installed independently of a device clock used for signal processing and hence an error will generate between devices with time. In the case where time-synchronization is attained by the PTP method, the time of a master device matches with the time of a slave device at a moment that time-synchronization has been attained. However, it may be unavoidable that an error generates between them with time after that.

Next, preferred embodiments will be described with reference to the accompanying drawings.

First Embodiment

Network Configuration

Figure 6:
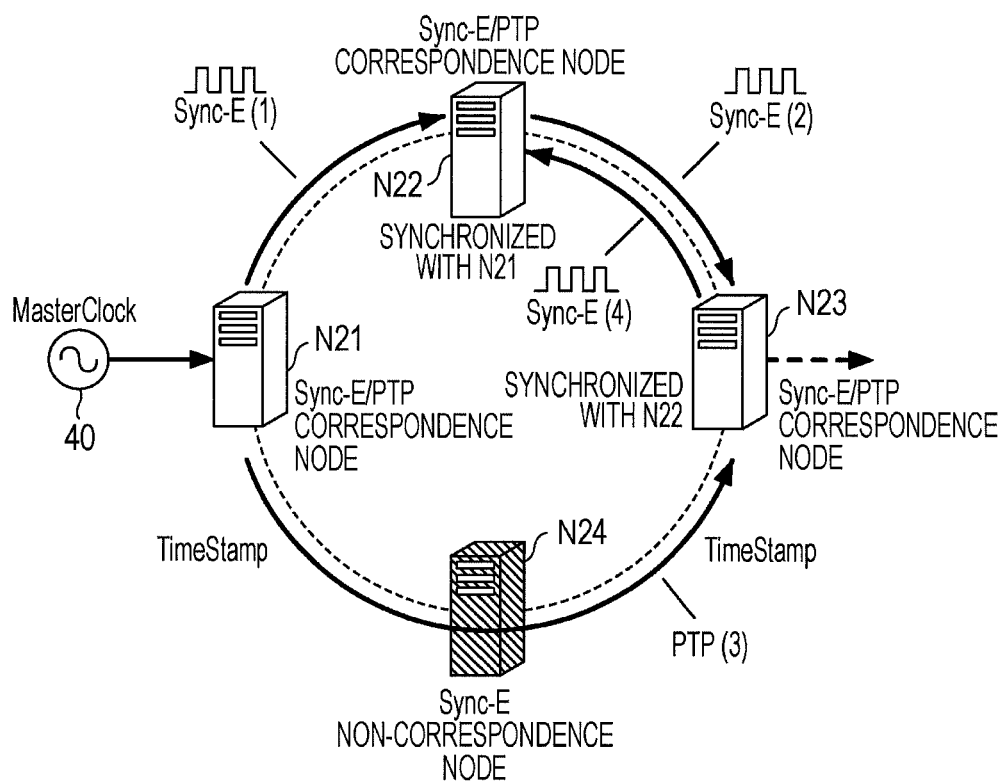
FIG. 6 is a diagram illustrating an example of a configuration of a network of the type to attain synchronization both by the Sync-E method and the PTP method.

FIG. 6 is a diagram illustrating an example of a configuration of an embodiment of a network which is configured to attain clock synchronization by both of the Sync-E method and the PTP method. In FIG. 6, an example of a ring-type network is illustrated. However, the configuration of the network is not limited to the ring-type one and the network may be in the form of a mesh. In the example illustrated in FIG. 6, nodes N21, N22 and N23 are Sync-E and PTP correspondence node devices and a node N24 is a Sync-E non-correspondence and PTP non-correspondence node device.

Each of the nodes N21, N22 and N23 is allowed to register clock sources including clocks which may be selected to be used for synchronization and to select the clock of highest quality from within clocks obtained from the registered clock sources to be used as a device clock. A send clock is generated using the device clock. In the embodiment illustrated in FIG. 6, two clock sources which may be selected as sources of clocks are prepared. Even in the case where three or more clock sources are prepared, the same operation as the above may be performed.

In addition, the quality of a master clock signal 40 is defined as PRC (Primary Reference Clock). That is, the SSM value thereof is set to "0x02" (0x is hexadecimal). The quality of an internal clock (Internal) is defined as SEC (SDH Equipment Clock) and the SSM value thereof is set to "0x0B". With respect to the quality of a clock obtained from a PTP packet, PTP parameters and clock classes which are defined in IEEE 1588 illustrated in FIG. 7 are used and a clock acquired from the master clock 40 belongs the clockClass 6 (decimal).

FIG. 8 is a diagram illustrating an example of a list of grades of priority allocated to clock sources of respective nodes. The node N21 is synchronized with the master clock 40 by selecting only a clock from the master clock 40 as a case list element. As a backup clock, an internal clock obtained from an internal oscillator is registered. For the node N22, transmission lines Sync-E (1) and Sync-E (4) are registered as case list elements and the priority grade 1 is allocated to the transmission line Sync-E (1) and the priority grade 2 is allocated to the transmission line Sync-E (4).

For the node N23, the priority grade 1 is allocated to a transmission line Sync-E (2) and the priority grade 2 is allocated to a transmission line PTP (3) and these lines are registered as case list elements. The node N24 is a Sync-E non-correspondence and PTP non-correspondence device and hence it may be difficult for the node N23 to send a packet signal which is in a clock-synchronized state. However, it may be possible for the node N23 to transmit a PTP packet through the transmission line PTP (3) by setting the line via VLAN or the like.

Each node compares the transmission lines to which the priority grade 1 and the priority grade 2 are allocated with each other to judge as to which line is to be selected firstly depending on which line is higher than the other line in terms of the quality and secondarily depending on which line is higher than the other line in terms of the priority grade in the case where these lines are the same as each other in the quality and determines one clock source on the basis of the above judgment.

The master clock 40 and the internal clock are registered as clock sources of the node N21. In comparing these clocks with each other in terms of the quality, the SSM value of the master clock 40 is "0x02" and the SSM value of the internal clock is "0x0B", that is, the quality of the master clock 40 is higher than that of the internal clock. Thus, the node N21 selects the master clock 40. The node N21 sends an ESMC packet including the SSM of the value "0x02" which indicates the clock quality of the master clock 40 onto the transmission line Sync-E (1).

The node N22 compares the transmission line Sync-E (1) with the transmission line Sync-E (4) in terms of the clock quality. The quality of the clock on the transmission line Sync-E (1) indicates the quality of the clock from the Node N21 and the quality of the clock on the transmission line Sync-E (4) indicates the quality of the clock from the node N23.

The node N23 compares the transmission line Sync-E (2) with the transmission line PTP (3) in terms of the clock quality. The quality of the clock on the transmission line Sync-E (2) indicates the quality of the clock from the Node N22 and the quality of the clock on the transmission line PTP (3) indicates the quality of the clock from the node N21. Incidentally, although the quality of the clock on the transmission line PTP (3) is determined in accordance with respective parameters defined in IEEE 1588, the definition of the quality of the clock on the transmission line PTP section is different from that of the SSM. Thus, in the node N23, the definition of the quality of the clock determined by the PTP method is converted to that of the quality indicated by the SSM and then the quality of the clock on the transmission line Synch-E (2) is compared with that of the clock on the transmission line PTP (3). Respective nodes compare the qualities of respective clocks with each other independently of one another to select their clock sources.

Figure 9:
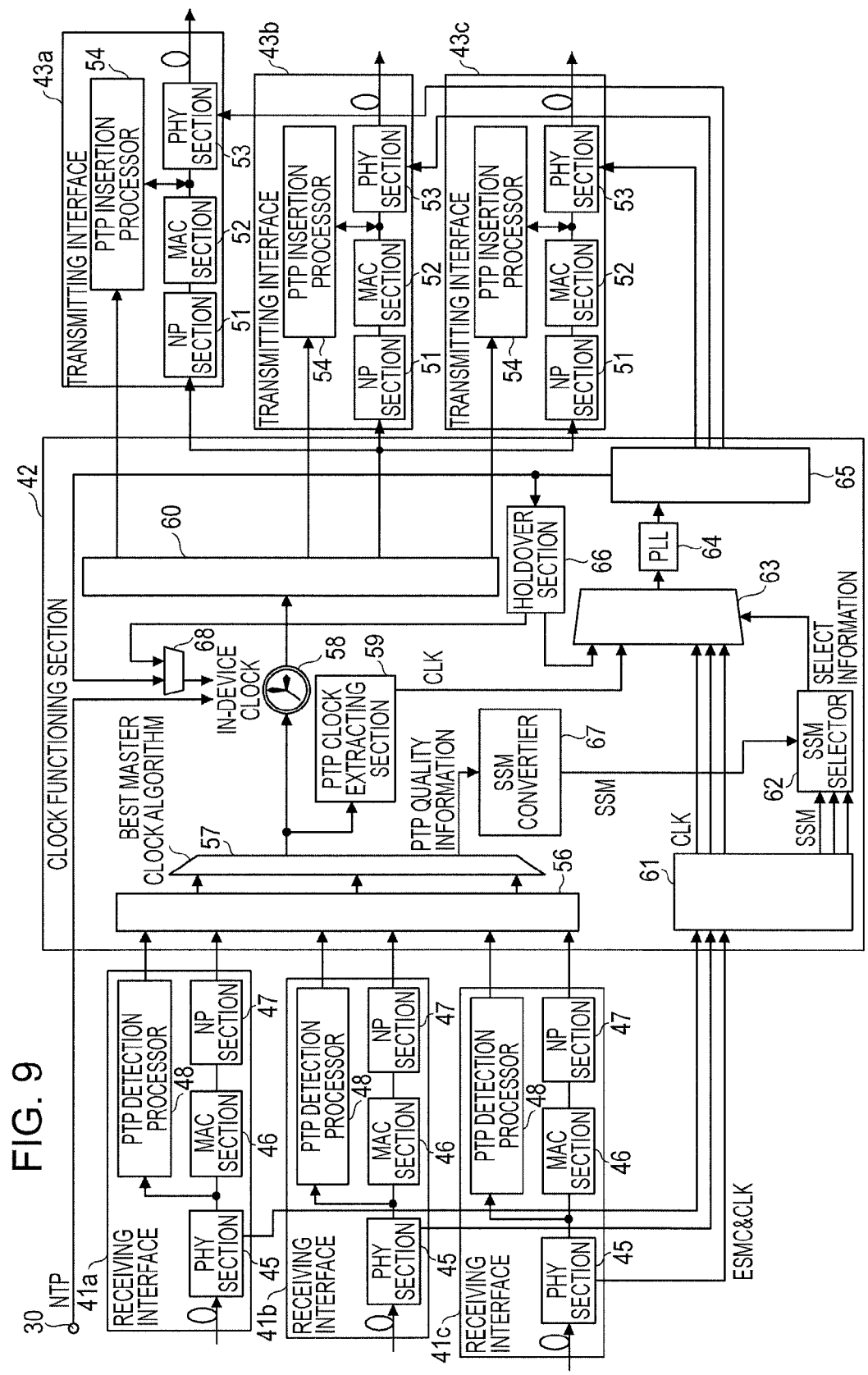
FIG. 9 is a block diagram illustrating an example of a configuration of a node device according to a first embodiment.

FIG. 9 is a block diagram illustrating an example of a configuration of a node device which will serve as each of nodes N21, N22 and N23 according to a first embodiment. The node device includes receiving interfaces 41a to 41c, a clock functioning section 42, and transmitting interfaces 43a to 43c.

In each of the receiving interfaces 41a to 41c, a PHY section 45 terminates a physical layer of a receive signal. A MAC section 46 controls a MAC layer. An NP (Network Processor) section 47 controls a packet. A PTP detection processor 48 detects a PTP packet and has a function of generating a reception time in order to realize PTP type synchronization. In addition, the PHY section 45 extracts a clock from a signal which has been received from a transmission line using a clock recovering function clock and extracts an ESMC packet in order to realize Sync-E type synchronization.

In each of transmitting interfaces 43a to 43c, an NP section 51 controls a packet. A MAC section 52 controls a MAC layer. A PHY section 53 controls a physical layer. In the case where a packet is to be sent, a PTP packet insertion processor 54 generates a time stamp of a transmission time and embeds the stamp in the PTP packet.

A clock functioning section 42 is mainly classified into a PTP function processor and a Synch-E function processor. In the PTP function processor, a PTP reception processor 56 performs receive processing on a PTP packet and periodically monitors for reception of each PTP packet. A best master clock algorithm section 57 selects the receive PTP packet of highest quality and sets the time of an in-device clock 58 to a reception time at which the receive PTP packet so selected has been received. The in-device clock 58 counts the time with a clock supplied thereto. A PTP clock extracting section 59 obtains a difference between pieces of time information of PTP packets which are sent thereto periodically and feedbacks difference information so obtained to a device clock included in the PTP clock extracting section 59. Owing to the above mentioned operations, a clock which is in synchronization with a clock of a source from which the PTP packet concerned is sent is generated. A PTP transmission processor 60 performs send processing on the PTP packet.

In addition, in order to switch from PTP type communication to Sync-E type communication, the best master clock algorithm section 57 extracts PTP clock quality information (a PTP clock class) from the received PTP packet of highest quality so selected. The extracted PTP clock quality information is converted to an SSM value (a value indicating the clock quality in terms of the SSM) using an SSM converter 67 and is supplied to an SSM selector 62.

In the Sync-E function processor, a Sync-E processor 61 receives reception clocks which are supplied from the receiving interfaces 41a to 41c and processes ESMC packets which are supplied from the receiving interfaces 41a to 41c to extract each SSM which is quality information from each ESMC packet. An SSM selector 62 generates select information used to select a port of higher quality on the basis of the SSM so extracted using the Sync-E processor 61 and the SSM value so converted using the SSM converter 67.

A CLK selector 63 selects one of the reception clock sent from the Sync-E processor 61 and the PTP clock sent from the PTP clock extracting section 59 on the basis of the select information sent from the SSM selector 62. A PLL 64 synchronizes a clock of a built-in oscillator with the selected clock and supplies the selected clock to a clock distributing section 65 as a device clock. The clock distributing section 65 distributes the clock to each of the transmitting interfaces 43a to 43c and also to the in-device clock 58 via a selector 68. In the case where selection of all the reception clocks may be difficult, a holdover section 66 supplies each clock sent from the clock distributing section 65 to the CLK selector 63 and also to the in-device clock 58 via the selector 68 in order to maintain the clock in a state in which it is ready to be used as a device clock. The selector 68 selects the clock sent from the clock distributing section 65 in a normal state or selects the clock sent from the holdover section 66 in a holdover state and supplies the selected clock to the in-device clock 58.

PTP Packet

Next, a PTP packet will be described with reference to FIGS. 10 to 12. FIG. 10 is a diagram illustrating an example of formats of PTP frames of a PTP packet. As the PTP frames, Preamble/SFD, Address of Destination, Address of Send Source, Type (=0x88F7), PTP Packet and FCS are registered.

FIG. 11 is a diagram illustrating an example of a common header which is used commonly by PTP packets. "transportSpecific" is used in low layers such as UDP and IP layers. "messageType" indicates the type (Sync, Delay_req or the like) of a message of each PTP packet. "versionPTP" indicates the version of each PTP packet and exhibits a value that a source device has.

"messageLength" indicates the total number of octets included in a PTP message. "domainNumber" indicates the domain to which the PTP message belongs. "flagFiled" indicates the property included in the message by putting up a flag concerned. "correctionField" is used for time setting performed in units of nanoseconds [nsec]. "sourcePortIdentity" indicates the ID of a port of a source. "sequenceId" indicates the ID of a sequence of the message. The value (for example, 0x00 for a Sync type message) of "controlField" is determined in accordance with the type of the message concerned. "logMessageInterval" indicates an interval between respective messages. "reserved" indicates that the column concerned is not currently used and is retained for future expansion.

FIG. 12A is a diagram illustrating an example of the formats of a "Sync" message and a delay request message. The common header in FIG. 11 enters "Common message header" and a time value on the source side enters "origin Timestamp".

FIG. 12B is a diagram illustrating an example of the format of a "Follow_up" message. The common header in FIG. 11 enters "Common message header" and the time value on the source side enters "origin Timestamp". The value of "origin Timestamp" which is included in the sent "Sync" message enters "preciseOrigin Timestamp".

FIG. 12C is a diagram illustrating an example of the format of a "Delay_Resp" message. The common header in FIG. 11 enters "Common message header" and the time value on the source side enters "origin Timestamp". A value of time at which the Delay_Req message has been received enters "receive Timestamp" and a value of "sourcePortIdentity" included in the received "Delay-Req" message enters "requestingPortIdentity". Incidentally, the time stamp value of each message is expressed using ten octets.

FIG. 12D is a diagram illustrating an example of the format of an "Announce" message. The common header in FIG. 11 enters "Common message header" and the time value on the source side enters "origin Timestamp". An offset time between TAI (International Atomic Times) and UTC (Coordinated Universal Time) enters "currentUtcOffset". An attribute value of "clockPriority1" of a grand master clock which is used in "Best Master Clock Algorithm" and exhibits an integral value from 0 to 255 enters "grandmasterPriority1".

An attribute value of "clockQuality" of the grand master clock enters "gransmasterClockQuality". The attribute value of "clockQuality" indicates the traceability counted from the grand master clock and includes "clockClass" which exhibits an integral value from 0 to 255, "clockAccuracy" which indicates the accuracy of time and exhibits a hexadecimal two-digit value, and "offsetScaledLogVariance" which indicates the stability of time and is calculated with an Alan deviation.

In addition, an attribute value of "clockProperty2" of the grand master clock which exhibits an integral value from 0 to 255 enters "gransmasterPriority2". An attribute value of "clockIndetity" of the grand master clock which is an eight-byte value used in the best master clock algorithm enters "gransmasterIdentity". A via value counted between the grand master clock and a local clock (a value counted in the case where the grand master clock is sent to a node having a local clock to be synchronized with the grand master clock via another node) enters "stepsRemoved". A time source (an atomic clock, a GPS, a PTP packet or the like) of the grand master clock enters "timeSource".

PTP Type Time-Synchronization

Figure 13:
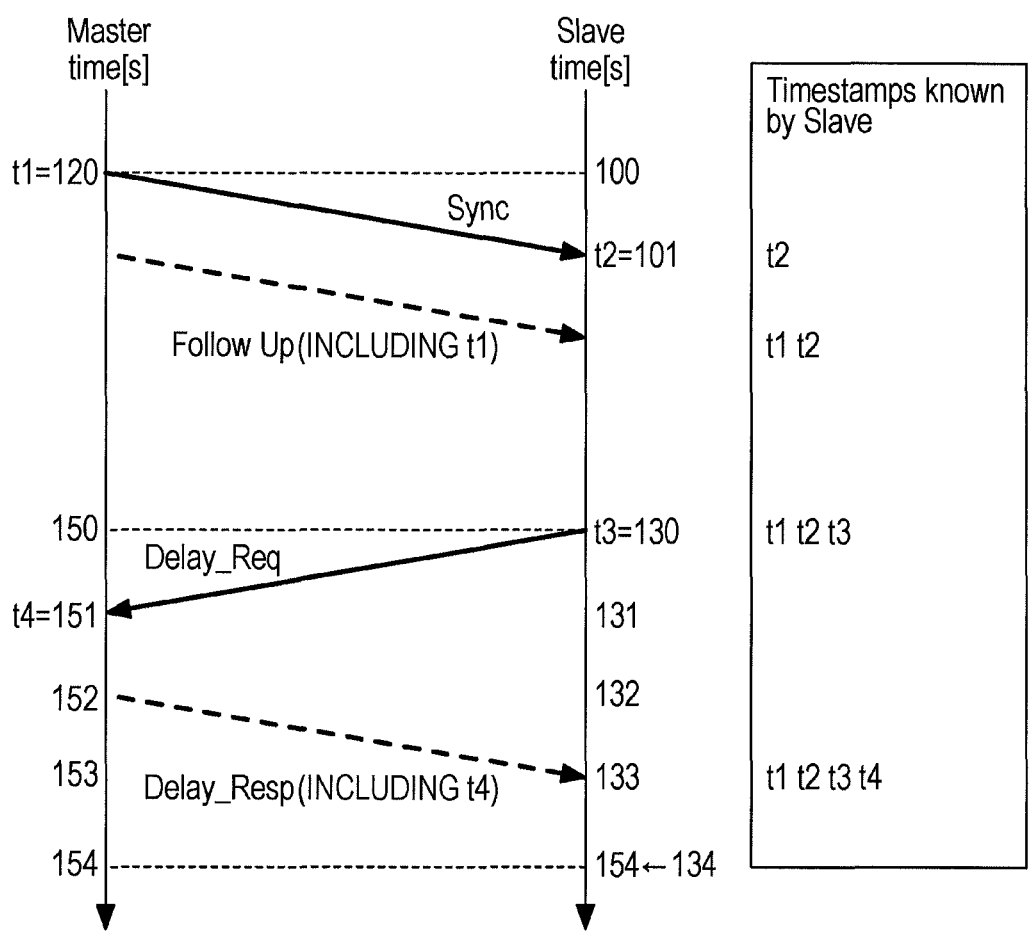
FIG. 13 is a diagram illustrating an example of a PTP-type time-synchronizing method.

A PTP type time-synchronizing method will be described with reference to FIG. 13. In PTP type time-synchronization, a master and a slave are present. In the case where a situation in which communication is performed between the nodes N21 and N22 in FIG. 6 is considered, the node N21 serves as the master and the node N22 serves as the slave. In the example illustrated in FIG. 13, a "Sync" message is sent from the master side to the slave side at a time t1. A reception time at which the slave side receives the "Sync" message is defined as t2. The slave side may find the value of t1 from the "Sync" message or a "Follow_Up" message which includes the transmission time t1 at which the "Sync" message has been sent. A difference between the master and the slave in time which includes a delay in communication directed from the master to the slave may be obtained by subtracting the time t1 from the time t2. The obtained value is defined as an offset value.

Next, the slave sends a "Delay_Req" message to the master at a time t3. A reception time at which the "Delay_Reg" message has been received on the master side is defined as t4. The master which has received the "Delay_Req" message sends the slave a "Delay_Resp" message including the time t4. The slave may find the value of the time t4 by receiving the "Delay_Resp" message. In addition, a difference between the master and the slave in time which includes a delay in communication directed from the slave to the master may be found by subtracting the time t3 from the time t4. The slave measures a transmission line delay using the values of the times t1, t2, t3 and t4 and then time-synchronization is performed on the slave side on the basis of the time on the master side.

Offset value=$t2-t1$

Transmission line delay=$[(t2-t1)+(t4-t3)]/2$

Post-synchronization slave time=Pre-synchronization slave time−Offset value+Transmission line delay As described above, in PTP type synchronization, a value of each delay in communication directed from the master to the slave is added to a value of each delay in communication directed from the slave to the master and an average value of the added values is defined as the value of transmission line delay. In the example in FIG. 13, in the case where time-synchronization has been performed at a slave time 134, the following values are obtained.

Offset value=$101-120=-19$

Transmission line delay=$[(101-120)+(151-130)]/2=1$

Post-synchronization slave time=$134-(-19)+1=154$

Figure 14:
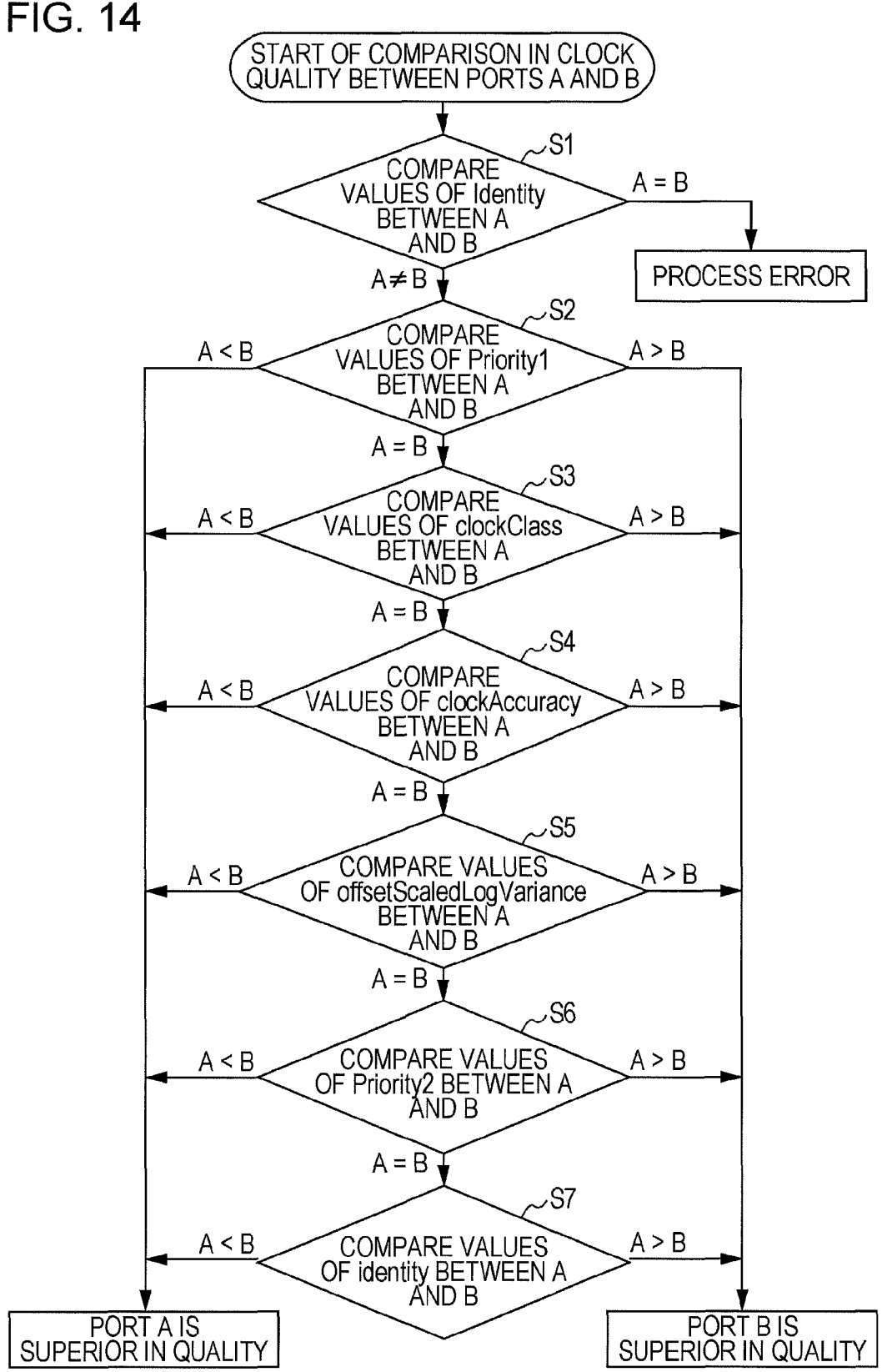
FIG. 14 is a diagram illustrating an example of a flowchart of an algorithm executed using a best master clock algorithm section.

FIG. 14 is a diagram illustrating an example of a flowchart of an algorithm of the best master clock algorithm section 57. The algorithm illustrated in FIG. 14 is taken to compare the qualities of two PTP ports (that is, receiving interfaces) A and B with each other to select one port which is superior in quality to the other port. Judgment is performed in order of parameters of an "Announce" message of a PTP packet which is defined in IEEE 1588 and in the case where the parameters concerned are not equal to each other, which one is superior to the other in quality is determined.

Step S1: Parameters "clockIdenity" are compared with each other
Step S2: Parameters "clockPriority1" are compared with each other
Step S3: Parameters "clockClass" are compared with each other
Step S4: Parameters "classAccuracy" are compared with each other
Step S5: Parameters offsetScaledLogVariance" are compared with each other
Step S6: Parameters "clockPriority2" are compared with each other
Step S7: Parameters "clockIdentity" are compared with each other.

Selecting Operation

A selecting operation performed using the node N23 illustrated in FIG. 6 will be described. It is assumed that the receiving interface 41a and the transmitting interface 43a are connected with the node N22 and the receiving interface 41b and the transmitting interface 43b are connected with the node N24. That is, the receiving interface 41a functions as a Sync-E type device and the receiving interface 41b operates as a slave to a PTP correspondence node.

In the example illustrated in FIG. 9, the Sync-E processor 61 extracts an SSM value from an ESMC packet that the receiving interface 41a has received. The SSM value so extracted is the SSM value that the node N22 sends to the node N23. The node N22 is already synchronized with the node N21 and hence the SSM value that the node N23 receives will be changed to 0x02.

On the other hand, PTP type communication is performed using only the receiving interface 40b, so that the best master clock algorithm section 57 selects the information sent from the receiving interface 41b. That is, the in-device clock 58 is time-synchronized with the PTP packet sent from the receiving interface 41b. The PTP clock extracting section 59 extracts a clock from the received PTP packet.

The best master clock algorithm section 57 extracts PTP clock quality information from the PTP packet which is received by the receiving interface 41b which serves as the slave to the PTP correspondence node as described above and the extracted PTP clock quality information is converted to an SSM value using the SSM converter 67. Each SSM value so converted indicates each PTP clock quality expressed in the format of the SSM.

The SSM converter 67 includes a table in which PTP clock qualities and SSM values are registered in one-to-one correspondence as illustrated in FIG. 15. In the example illustrated in FIG. 15, a clock of PTP clockClass 6 is registered in correspondence with the SSM value "0100" (low four bits are binary-represented), a clock of PTP clockClass 13 is registered in correspondence with the SSM value "1000", clocks of PTP clockClasses 52, 58, 187, 193, 248 and 255 are registered in correspondence with the SSM value "1011", and clocks of PTP clockClasses 0 to 5, 7, 8 to 12, 14, 15 to 51, 53 to 57, 59 to 186, 188 to 192, 194 to 247, and 249 to 254 are registered in correspondence with the SSM value "1111". The above mentioned correspondence relation between the PTP clock qualities and the SSM values is set by an operator. In the example illustrated in FIG. 15, the accuracy of the PTP clock is regarded to be equivalent to "SSU-A" and the SSM value thereof is defined as "0100".

When the above clock quality of the Sync-E type clock is compared with the clock quality of the PTP type clock in terms of the SSM values, the clock quality (SSM=0x02) of the Sync-E type clock is higher in priority than the clock quality (SSM=0x04) of the PTP type clock, so that the node N23 selects the clock which is obtained from the receiving interface 41a, that is, the Sync-E type clock. In the above mentioned case, the SSM which is output from the transmitting interface 43a enters a DNU state (SSM=0x0F) in order to avoid timing loop. Incidentally, the transmitting interface 43b is a slave and hence does not send any PTP packet.

Clock synchronization is realized in order of the master clock 40, the node N21, the node N22 and the node N23 using a transmission line clock by performing the same switching operation as the above. A clock with which the clock of each node has been synchronized is used as a device clock. The clock distributing section 65 converts the frequency of the device clock to an appropriate clock frequency and distributes the clock so frequency-converted to the respective transmitting interfaces 43a to 43C as a clock to be used in the PHY section 53 of each transmitting interface. The PHY section 53 sends a signal in synchronization with the clock. In addition, a clock to be used as a reference may be desirable in order to operate the in-device clock 58 and hence the clock distributing section generates a clock to be used for the in-device clock 58 and distributes the generated clock to the in-device clock 58. Owing to the above mentioned operation, it may become possible to synchronize the time of the in-device clock 58 with the device clock.

Operations Performed in Occurrence of Fault

Next, a situation in which it becomes difficult to extract a clock from all of the transmission lines and PTP packets owing to occurrence of a fault will be considered. In the above mentioned situation, the device clock enters a holdover state. That is, the previous frequency is held. Likewise, the in-device clock 58 enters the holdover state. In this embodiment, the selector 68 is provided to use a holdover section 66 for an in-device time also as a holdover section for the device clock to realize size reduction of a circuit.

Figure 16:
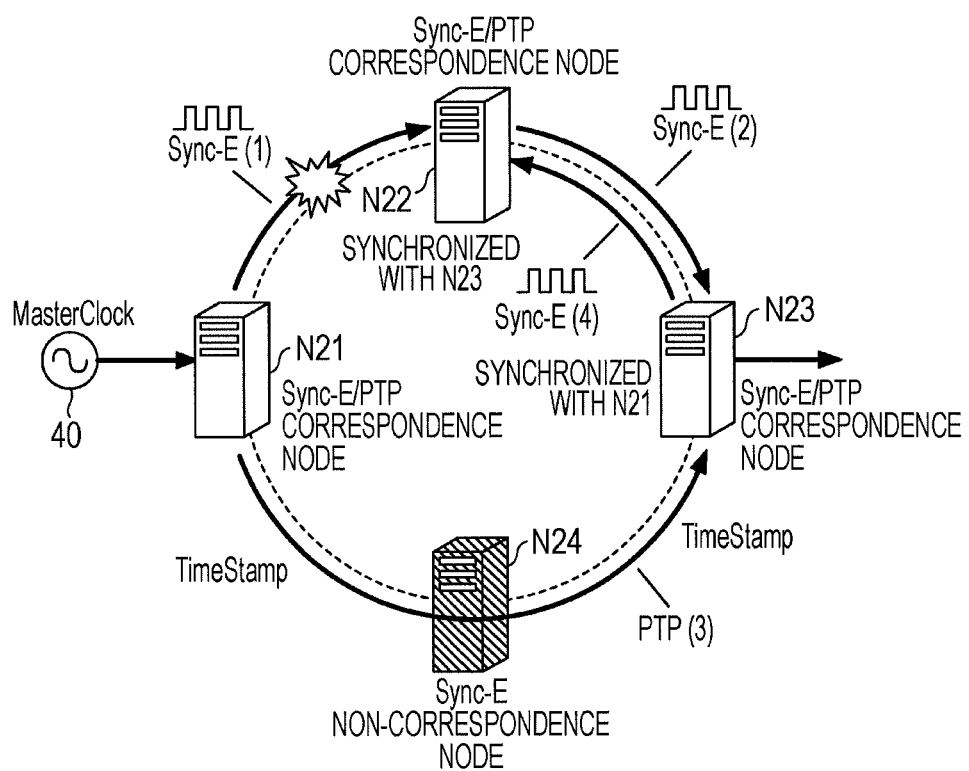
FIG. 16 is a diagram illustrating an example of a network in which a fault has occurred.

The switching operations will be performed in the following manner in the case where a fault has occurred in the transmission line Sync-E (1) between the node N21 and the node N22 as illustrated in the example in FIG. 16.

(1) Before a fault occurs, the node N22 receives the SSM value 0x02 (PRC) from the transmission line Sync-E (1) and the SSM value "0x0F" (DNU) from the transmission line Sync-E (4).
(2) A fault (such as disconnection of the transmission line) has occurred and the node N22 detects that the fault has occurred in the transmission line.
(3) The node N22 judges that the transmission line Sync-E (1) is disabled.
(4) The node N22 shifts to a holdover state because there is no enabled clock source and uses a holdover clock. In the above mentioned situation, the in-device clock 58 also uses the same holdover clock.
(5) Since the clock selected using the Node N22 is in the holdover state, the SSM value to be sent is changed to 0x0B (SEC).
(6) The node N23 utilizes that the SSM value of the Sync-E (2) section has been changed to 0x0B as a trigger to compare the clock quality of a clock obtained from the transmission line Sync-E (2) with the clock quality of a clock obtained from the transmission line PTP (3). The SSM value of the clock obtained from the transmission line Sync-E (2) is 0x0B and the SSM value of the clock obtained from the transmission line PTP (3) is 0x04, so that the clock obtained from the transmission line PTP (3) is higher in priority than the clock obtained from the transmission line Sync-E (2).
(7) The node N23 switches the current clock source to a new one on the basis of a result obtained from the operation described in the item (6). That is, the node N23 uses the transmission line PTP (3) as a new clock source.
(8) The node N23 sends an ESMC packet with the SSM value set to 0x04 onto the transmission line Sync-E (4). No timing loop occurs in the transmission line Sync-E (4), so that the node N23 sends the value 0x04 instead of the value 0x0F.
(9) The SSM value of the clock which is obtained from the transmission line Sync-E (4) has been changed from 0x0F to 0x04, so that it may become possible for the node N22 to select the transmission line Sync-E (4). Thus, the transmission line Sync-E (4) is selected.

Periodic Monitor for PTP Packet

Figure 17:
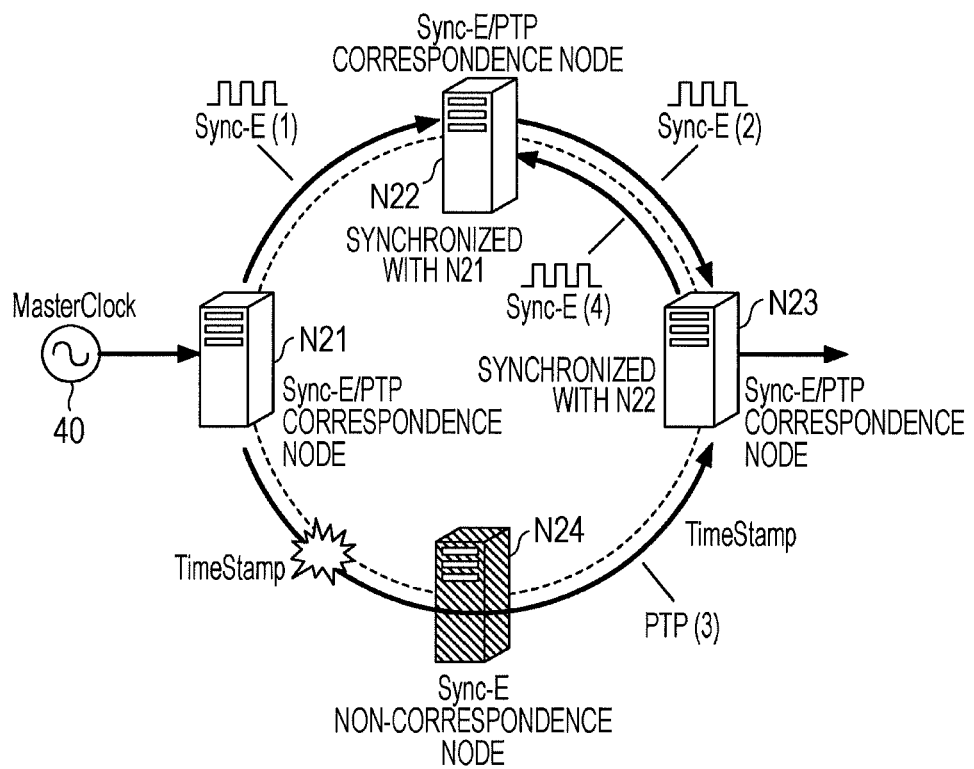
FIG. 17 is a diagram illustrating an example of a network in which a fault has occurred.

In the case where a fault has occurred in a PTP section as illustrated in the example in FIG. 17, it may be difficult for the node N23 which is a PTP slave to directly detect the fault. In the above mentioned case, any PTP packet does not reach the node N23 and hence occurrence of the fault may be indirectly detected on the slave side. It may become difficult to extract a clock from the PTP packet. In spite of the fact that the fault occurred in the PTP section leads to occurrence of a fault in clock extraction, switching of a clock source may be difficult.

In order to avoid a situation as mentioned above, the PTP reception processor 56 periodically monitors for reception of each PTP packet per port (that is, per receiving interface) and judges that a clock is disabled in the case where any PTP packet does not arrive for a time period longer than a fixed time period and then the SSM converter 67 changes the SSM value to 0x0F (DNU). When the SSM has been changed to the value indicative of the DNU state, it is judged that the clock concerned is disabled and the SSM selector 62 removes the clock from a list of objects to be selected. Owing to the above mentioned operations, it may become possible to normally perform clock source switching on the basis of the SSM value regardless of occurrence of a fault in a PTP clock caused by the occurrence of a fault in a transmission line which is not adjacent to the node concerned.

Figure 18:
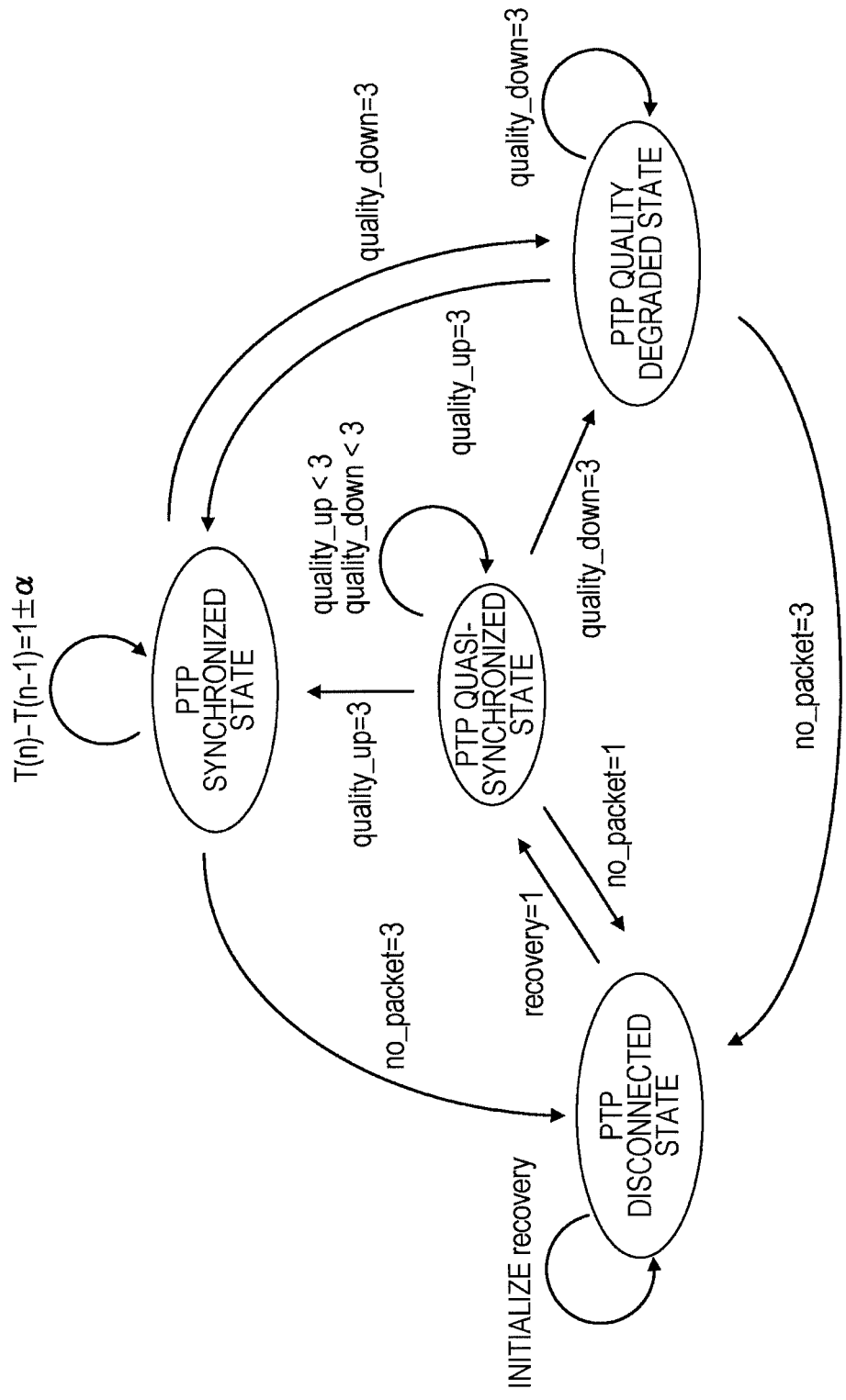
FIG. 18 is a diagram illustrating an example of a flowchart of a process of starting to monitor for a PTP packet.

FIG. 18 is a diagram illustrating an example of state transition occurred in each node serving as a node device. In the example illustrated in FIG. 18, it is assumed that the initial value of the monitor interval (Interval) is 0 sec, and each of the initial values of the number of PTP packet receiving operations (n), the PTP packet not-receiving frequency (no_packet), the quality degraded state (quality_down), the quality recovered state (quality_up) and the recovery (recovery) from a PTP disconnected state is 0. The example illustrated in FIG. 18 indicates that, for example, in a PTP synchronized state, when "quality_down"=3, the states is shifted to the PTP quality degraded state and when "no_packet"=3, the state is shifted to the PTP disconnected state. It is also indicated that in the PTP quality degraded state, when "quality_up"=3, the state is shifted to the PTP synchronized state and when "no_packet"=3, the state is shifted to the PTP disconnected state. Likewise, in a PTP quasi-synchronized state, when "quality_up"=3, the state is shifted to the PTP synchronized state, when "quality_down"=3, the state is shifted to the PTP quality degraded state, and when "no_packet"=1, the state is shifted to the PTP disconnected state.

Figure 19:
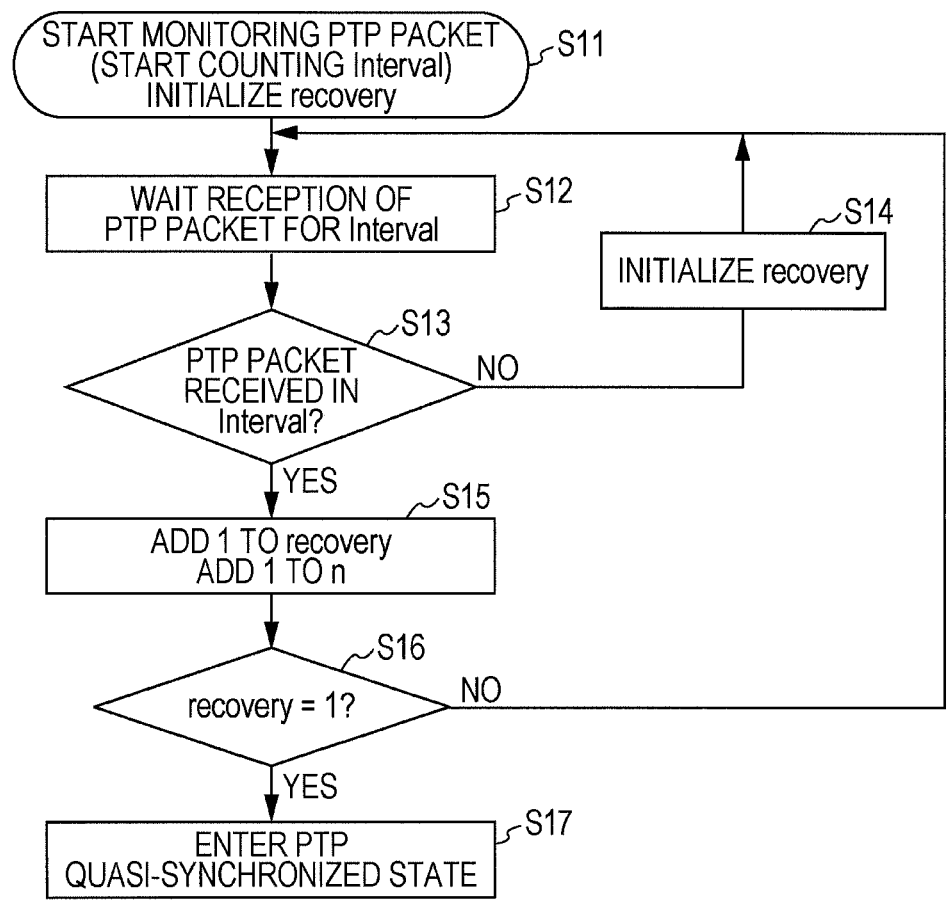
FIG. 19 is a diagram illustrating an example of a flowchart of a process of starting to monitor a PTP packet.

FIG. 19 is a diagram illustrating an example of a flowchart of a process of starting to monitor for a PTP packet to be executed per port (per receiving interface) using the PTP reception processor 56. At step S11, in a state in which "recovery"=0, counting of "Interval" (a predetermined term) is started. At step S12, reception of a PTP packet is waited for "Interval". At step S13, it is judged whether the PTP packet has been received in "Interval" and in the case where it is not received, "recovery" is initialized ("recovery"=0) at step S14 and the process proceeds to step S12.

In the case where the PTP packet has been received, "1" is added to "recovery" and "1" is added to "n" at step S16. Then, it is judged whether "recovery"=1 at step S16 and when "recovery"≠1, the process proceeds to step S12, or when "recovery"=1, the state is shifted to the PTP quasi-synchronized state at step S17.

Figure 20:
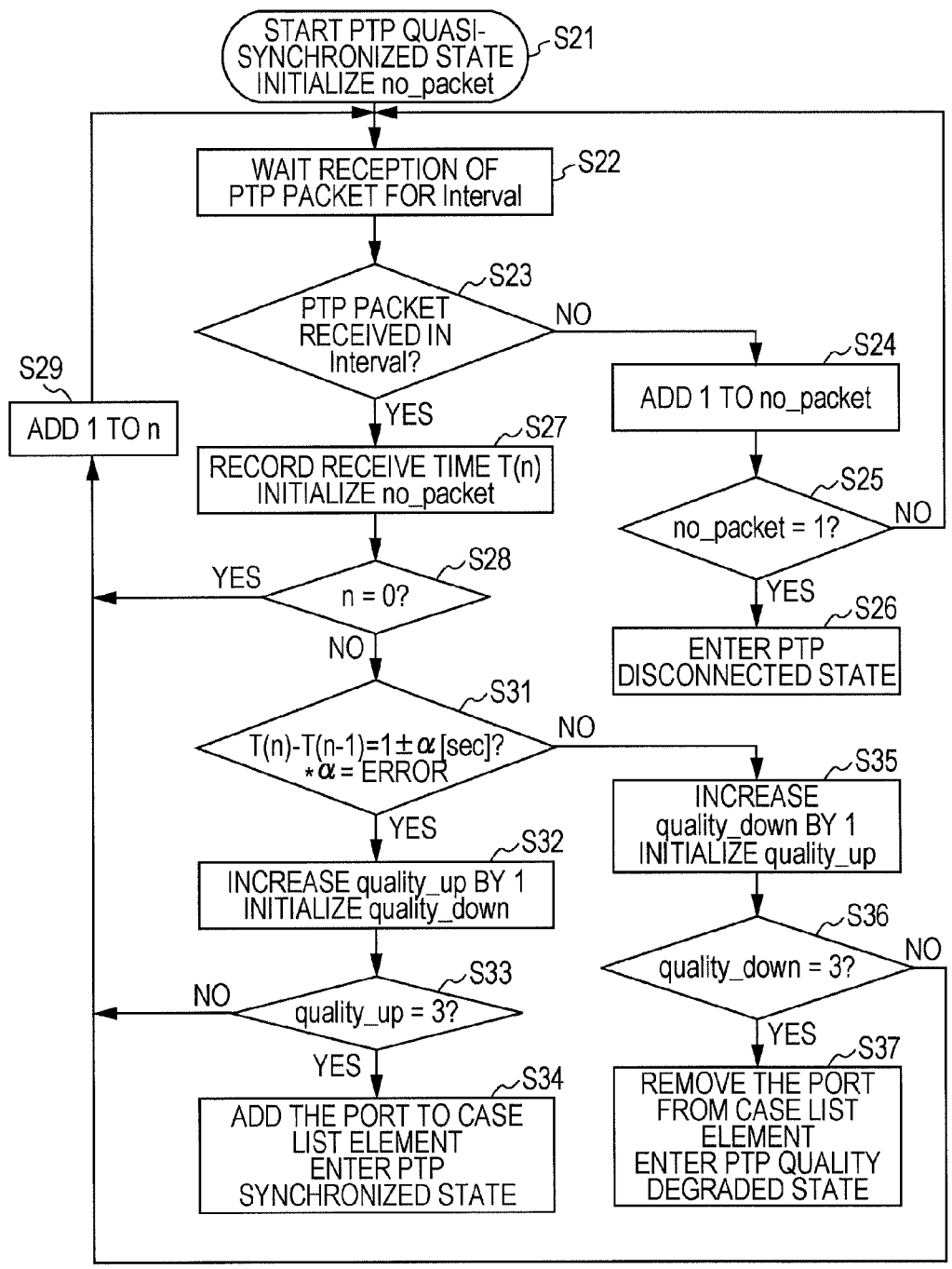
FIG. 20 is a diagram illustrating an example of a flowchart of a process of starting a PTP quasi-synchronized state (a quasi-synchronized state obtained by the PTP method)

FIG. 20 is a diagram illustrating an example of a flowchart of a process of starting a PTP quasi-synchronized state to be executed using the PTP reception processor 56. At step S21, "no_packet" is initialized ("no_packet"=0) and reception of a PTP packet is waited for "Interval" at step S22. It is judged whether the PTP packet has been received in "Interval" at step S23, and when it is not received, "1" is added to "no_packet" at step S24. Then, it is judged whether "no_packet"=1 at step S25, when "no_packet"≠1, the process proceeds to step S22, or when "no_packet"=1, the state is shifted to the PTP disconnected state at step S26.

In the case where the PTP packet has been received in "Interval" at step S23, the reception time T (n) is recorded at step S27 and "no_packet" is initialized ("no_packet"=0). Then, it is judged whether n=0 at step S28, and when n=0, "1" is added to "n" at step S29 and the process proceeds to step S22. When n≠1, the process proceeds to step S31.

It is judged whether $T(n)-T(n-1)=1\pm\alpha$ at step S31. Here, "α" is a predetermined value indicating an error. When $T(n)-T(n-1)=1\pm\alpha$, "1" is added to "quality_up" at step S32 and "quality_down" is initialized ("quality_down"=0). Then, it is judged whether "quality_up"=3 at step S33 and when "quality_up"≠3, "1" is added to "n" at step S29 and the process proceeds to step S22. When "quality_up"=3, the port concerned is added to a list of case list elements and the state is shifted to the PTP synchronized state at step S34.

When $T(n)-T(n-1)\neq 1\pm\alpha$ at step S31, "1" is added to "quality_down" at step S35 and "quality_up" is initialized ("quality_up"=0). Then, it is judged whether "quality_down"=3 at step S36 and when "quality_down"≠3, "1" is added to "n" at step S29 and then the process proceeds to step S22. When "quality_down"=3, the port concerned is removed from the list of case list elements and the state is shifted to the PTP quality degraded state at step S37.

Figure 21:
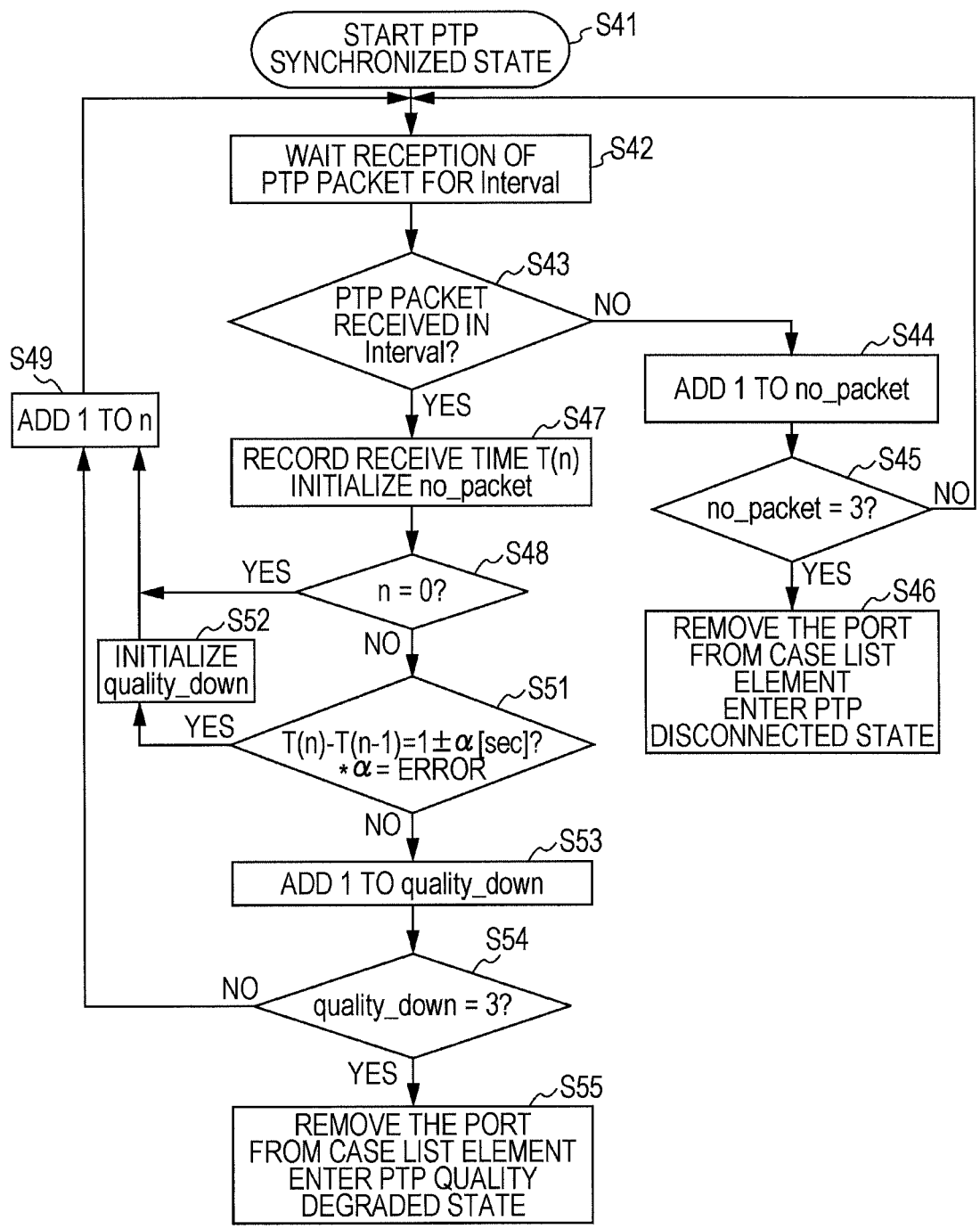
FIG. 21 is a diagram illustrating an example of a flowchart of a process of starting a PTP synchronized state.

FIG. 21 is a diagram illustrating an example of a flowchart of a process of starting a PTP synchronized state to be executed using the PTP reception processor 56. The PTP synchronized state is started at step S41 and then reception of a PTP packet is waited for "Interval" at step S42. It is judged whether the PTP packet has been received in "Interval" at step S43, and when it is not received, "1" is added to "no_packet" at step S44. Then at step S45, it is judged whether "no_packet"=3, and when "no_packet"≠3, the process proceeds to step S42, or when "no_packet"=3, the port concerned is removed from the list of case list elements and the state is shifted to the PTP disconnected state at step S46.

In the case where the PTP packet has been received in "Interval" at step S43, the reception time T (n) is recorded at step S47 and "no_packet" is initialized ("no_packet"=0). Then, it is judged whether n=0 at step S48, and when n=0, "1" is added to "n" at step S49 and the process proceeds to step S42. When n≠0, the process proceeds to step S51.

It is judged whether $T(n)-T(n-1)=1\pm\alpha$ at step S51. When $T(n)-T(n-1)=1\pm\alpha$, the "quality_down" is initialized ("quality_down"=0) at step S52, "1" is added to "n" at step S49 and the process proceeds to step S42. Then, when $T(n)-T(n-1)\neq 1\pm\alpha$ at step S51, "1" is added to "quality_down" at step S53. Then, it is judged whether "quality_down"=3 at step S54 and when "quality_down"≠3, "1" is added to "n" at step S49 and the process proceeds to step S42. When "quality_down"=3, the port concerned is removed from the list of case list elements and the state is shifted to the PTP quality degraded state at step S55.

Figure 22:
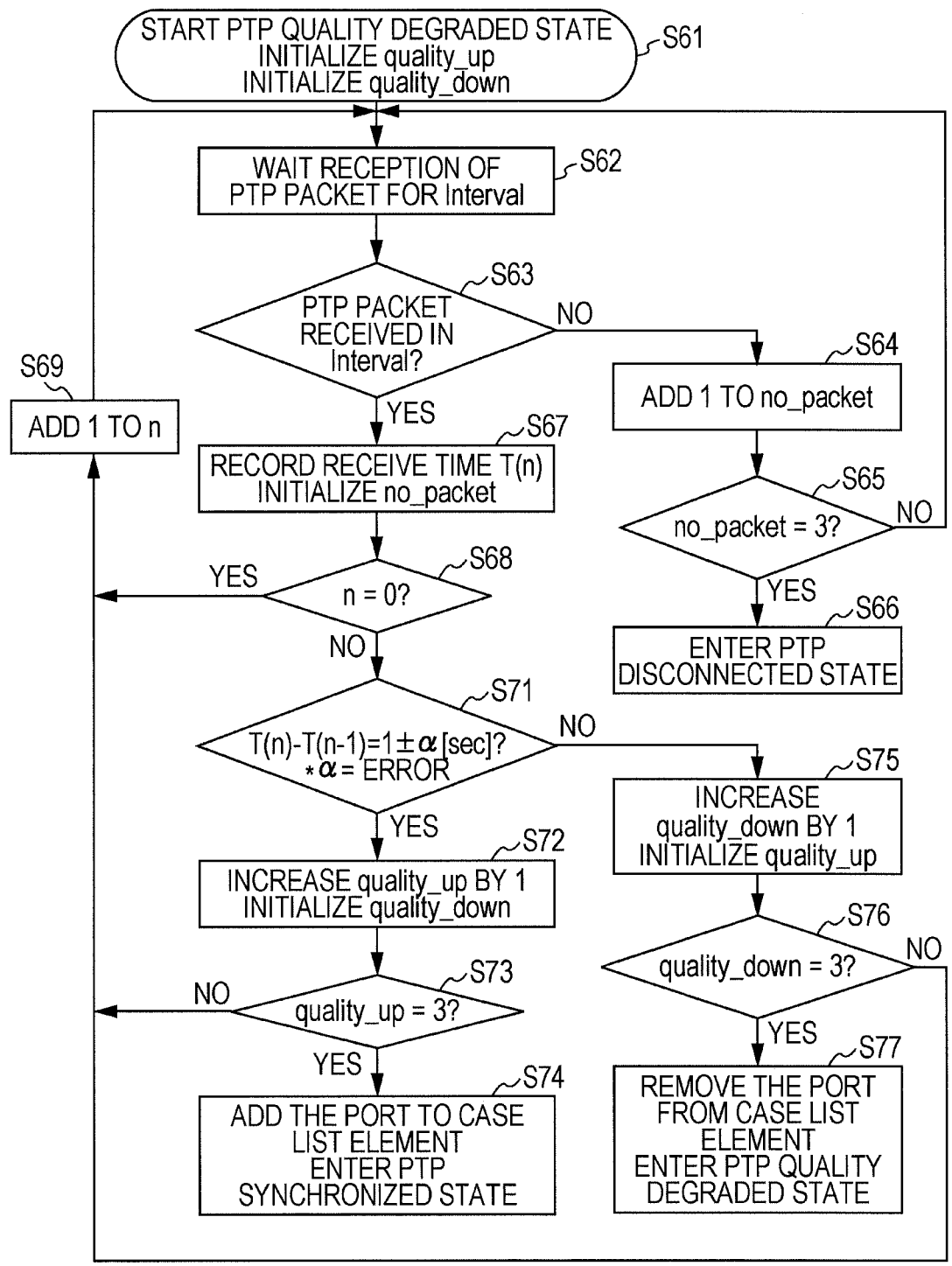
FIG. 22 is a diagram illustrating an example of a flowchart of a process of starting a PTP quality-degraded state.

FIG. 22 is a diagram illustrating an example of a process of starting a PTP quality degraded state to be executed using the PTP reception processor 56. At step S61, "quality_up" is initialized ("quality_up"=0) and "quality_down" is initialized ("quality_down"=0) and reception of a PTP packet is waited for "Interval" at step S62. It is judged whether the PTP packet has been received in "Interval" at step S63. When it is not received, "1" is added to "no_packet" at step S64. Then at step S65, it is judged whether "no_packet"=3 and when "no_packet"≠3, the process proceeds to step S62 or when "no_packet"=3, the state is shifted to the PTP disconnected state at step S66.

In the case where the PTP packet has been received in "Interval" at step S63, the reception time T(n) is recorded and "no_packet" is initialized ("no_packet"=0) at step S67. Then at step S68, it is judged whether n=0. When n=0, "1" is added to "n" at step S69 and the process proceeds to step S62. When n≠0, the process proceeds to step S71.

It is judged whether $T(n)-T(n-1)=1\pm\alpha$ at step S71. When $T(n)-T(n-1)=1\pm\alpha$, "1" is added to "quality_up" and "quality_down" is initialized ("quality_down"=0) at step S72. Then, it is judged whether "quality_up"=3 at step S73, and when "quality_up"≠3, "1" is added to "n" at step S69 and the process proceeds to step S62. When "quality_up"=3, the port concerned is added to the list of case list elements and the state is shifted to the PTP synchronized state at step S74.

When $T(n)-T(n-1)\neq 1\pm\alpha$ at step S71, "1" is added to "quality_down" at step S75 and "quality_up" is initialized ("quality_up"=0) at step S75. Then, it is judged whether "quality_down"=3 at step S76, and when "quality_down"≠3, "1" is added to "n" at step S69 and the process proceeds to step S62. When "quality_down"=3, the port concerned is added to the list of case list of elements and the state is shifted to the PTP quality degraded state at step S77.

Other Embodiments of Table in which PTP Clock Qualities and SSM Values are Registered in One to One Correspondence In a table in which PTP clock qualities and SSM values are registered in one to one correspondence, SSM values indicating respective PTP clock qualities may be additionally defined in the columns of "SSM description" which are registered as "Reserved" columns in the table illustrated in FIG. 15, in addition to the PTP clock qualities which are allocated to the existing SSM values as illustrated in the table in FIG. 15. An example of the table in which the PTP clock qualities and the SSM values are registered in one to one correspondence and which is obtained in the above mentioned situation is illustrated in FIG. 23.

In the example illustrated in FIG. 23, a clock of PTP clockClass 6 is registered in correspondence with the SSM value "0011", a clock of PTP clockClass 13 is registered in correspondence with the SSM value "0101", clocks of PTP clockClasses 52 and 58 are registered in correspondence with the SSM value "0110", clocks of PTP clockClasses 187 and 193" are registered in correspondence with the SSM value "0111", clocks of PTP clockClasses 248 and 255 are registered in correspondence with the SSM value "1001", and clocks of PTP clockClasses 0 to 5, 7, 8 to 12, 14, 15 to 51, 53 to 57, 59 to 186, 188 to 192, 194 to 247, and 249 to 254 are registered in correspondence with the SSM value "1111". The above mentioned correspondence relation is set by an operator.

In addition, the relation between the SSM values and the orders of priority in the example illustrated in FIG. 23 is as illustrated in FIG. 24. That is, the priority order is proportional to order in which the SSM values are registered.

Second Embodiment

Figure 25:
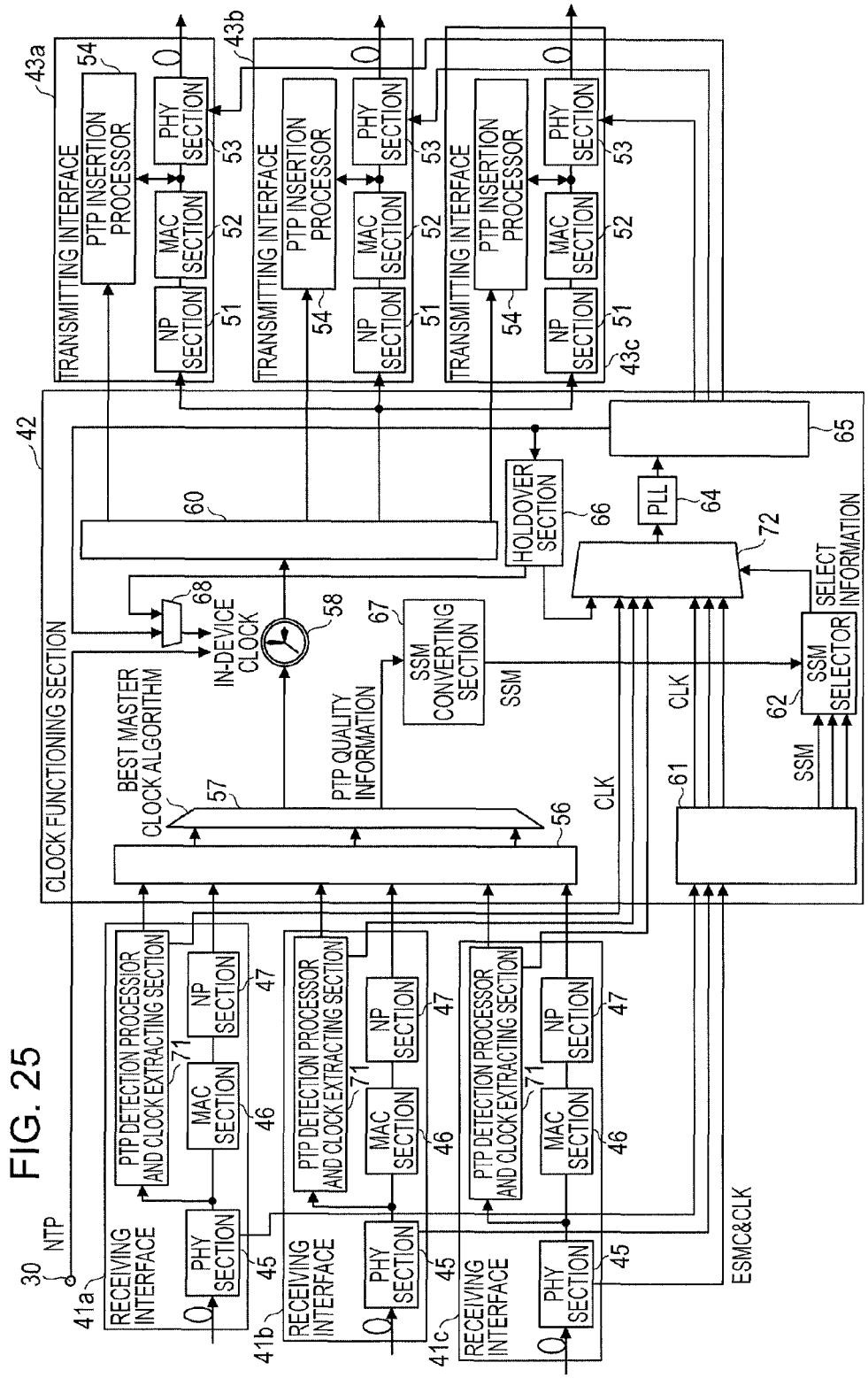
FIG. 25 is a diagram illustrating an example of a configuration of a node device according to a second embodiment.

FIG. 25 is a block diagram illustrating an example of a configuration of a node device which will serve as the nodes N21, N22 and N23 according to a second embodiment. In the example in FIG. 25, the same numerals are assigned to the same parts as those in FIG. 9. In the first embodiment illustrated in FIG. 9, PTP clock extraction is performed using the PTP clock extracting section 59 which is disposed at the rear stage of the best master clock algorithm section 57. On the other hand, in the second embodiment illustrated in FIG. 25, PTP clock extraction is performed using each of receiving interfaces 41a to 41c. Therefore, a PTP detection processing and clock extracting section 71 which is disposed in each of the receiving interfaces 41a to 41c is configured to detect a PTP packet, to generate a reception time for realizing PTP clock extraction and then to perform PTP clock extraction which is the same as that performed using the PTP clock extracting section 59. A PTP clock which has been extracted using the PTP detection processing and clock extracting section 71 included in each of the receiving interfaces 41a to 41c is supplied to a CLK selector 72 included in the clock functioning section 42. The CLK selector 72 selects one of the reception clock received from the Sync-E processor 61 and the PTP clock sent from the respective PTP detection processing and clock extracting sections 71 included in the receiving interfaces 41a to 41c on the basis of select information sent from the SSM selector 62.

In the second embodiment, clock extraction is executed in the vicinity of the PHY section 45 and hence clock extraction may be executed with no influence of delays and fluctuations in packet sending which would occur in the MAC section 46, the NP section 47 and respective functional sections of the clock functioning section 42 which are disposed at the rear stages, so that factors for quality reduction of the reception clock may be eliminated.

Third Embodiment

Figure 26:
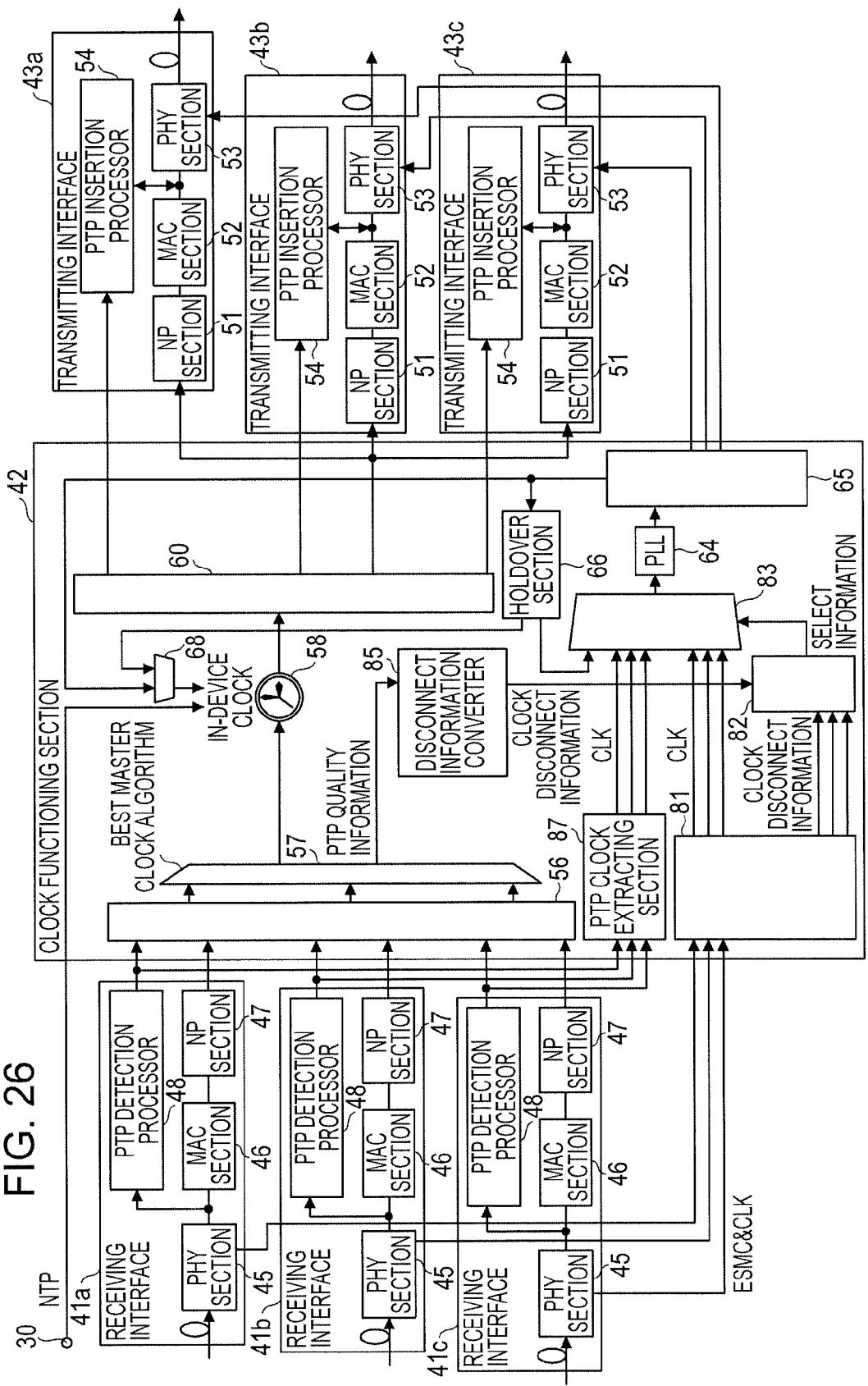
FIG. 26 is a diagram illustrating an example of a configuration of a node device according to a third embodiment.

FIG. 26 is a block diagram illustrating an example of a node device which will serve as the nodes N21, N22 and N23 according to a third embodiment. In the example illustrated in FIG. 26, the same numerals are assigned to the same part as those in FIG. 9. In the first embodiment illustrated in FIG. 9, the qualities of respective clocks are compared with one another to select the reception clock of highest quality from within the clocks so compared. On the other hand, in the third embodiment illustrated in FIG. 26, the priority is set in advance at each port of each of the receiving interfaces 41a to 41c and a reception clock is selected in accordance with the priority of each port.

In the example illustrated in FIG. 26, reception clocks which have been extracted using the PHY sections 45 in the receiving interfaces 41a to 41c are supplied to a Sync-E processing and clock disconnection detecting section 81 included in the clock functioning section 42. The Sync-E processing and clock disconnection detecting section 81 receives the reception clocks supplied from the receiving interfaces 41a to 41c and detects disconnection of each reception clock.

A Priority selector 82 generates select information used to select the clock of highest priority from within not-disconnected clocks on the basis of a signal used to detect disconnection of each clock sent from the Sync-E processing and clock disconnection detecting section 81 and clock disconnect information sent from a disconnect information converter 85 which will be described later and supplies the select information to a CLK selector 83.

In addition, a PTP packet which has been detected using the PTP detection processor 48 in each of the receiving interfaces 41a to 41c is supplied to a PTP clock extracting section 87 included in the clock functioning section 42. The PTP clock extracting section 87 extracts a PTP clock from the received PTP packet per port in the same manner as the PTP clock extracting section 59 and supplies the extracted PTP clock to the CLK selector 83. PTP clock quality information of a clock source which has been selected using the best master clock algorithm section 57 is supplied to the disconnect information converter 85 and the disconnect information converter 85 acquires disconnection detect information from the above PTP quality information and supplies the acquired information to the Priority selector 82. The CLK selector 83 selects one clock from within respective reception clocks supplied from the Sync-E processing and clock disconnection detecting section 81 and the respective PTP clocks supplied from the PTP clock extracting sections 87 in accordance with the select information supplied from the Priority selector 82 and supplies the selected clock to the PLL 64.

Figure 27:
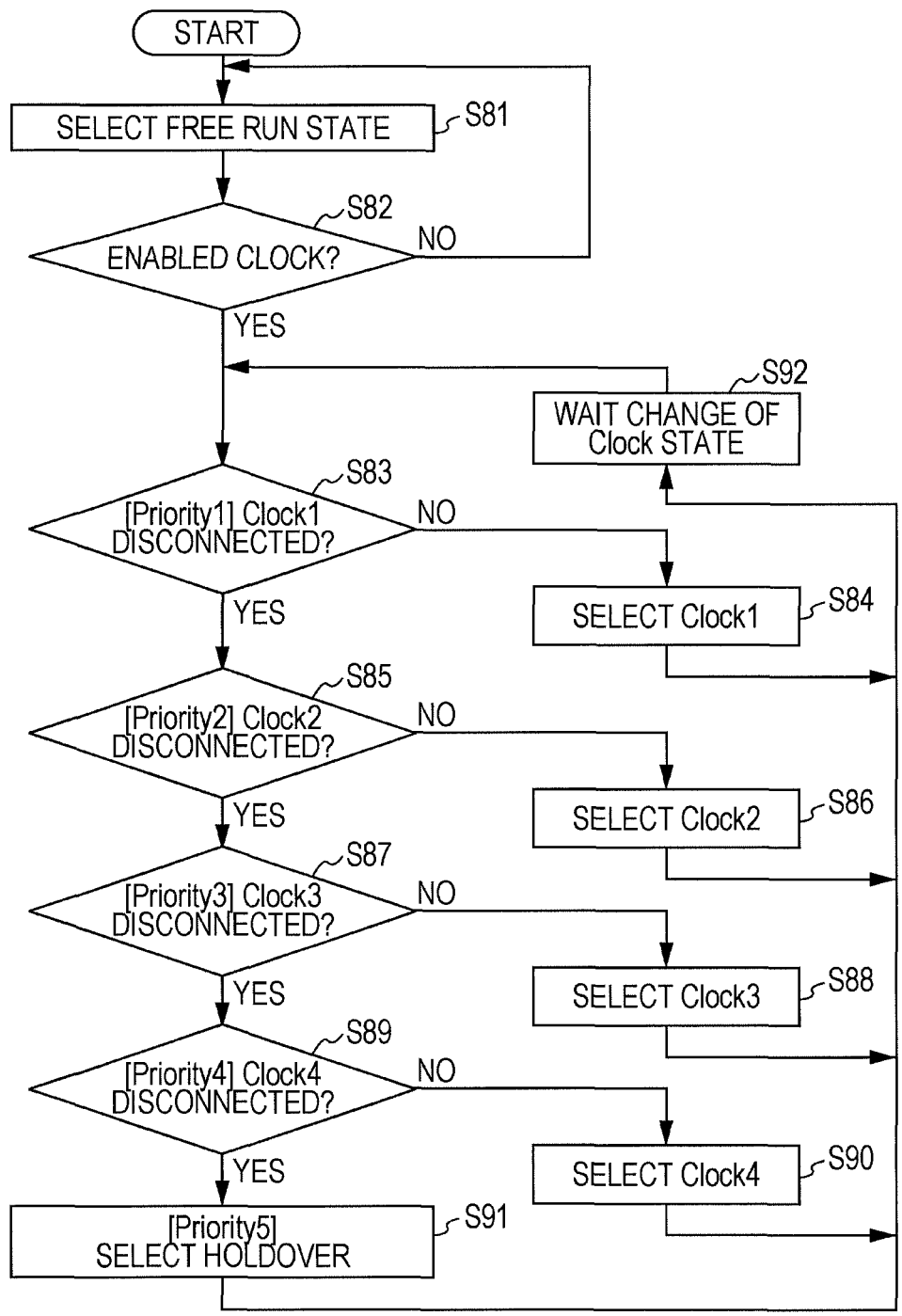
FIG. 27 is a diagram illustrating an example of a flowchart of a selecting process.

FIG. 27 is a diagram illustrating an example of a flowchart of a selecting process to be executed using the Priority selector 82. As a precondition of this process, ports to be used as clock sources are designated for the Priority selector 82 and respective grades of priority are allocated to the designated ports. For example, a reception clock which is received by the receiving interface 41a and is output from the Sync-E processing and clock disconnection detecting section 81 is registered into the Priority selector 82 as a clock of the priority 1, a reception clock which is received by the receiving interface 41b and is output from the Sync-E processing and clock disconnection detecting section 81 is registered into the Priority selector 82 as a clock of the priority 2 and a reception clock which is received by the receiving interface 41c and is output from the Sync-E processing and clock disconnection detecting section 81 is registered into the Priority selector 82 as a clock of the priority 3.

In addition, a PTP clock which is extracted using the PTP detection processor 48 of the receiving interface 41a is registered into the Priority selector 82 as a clock of the priority 4. Likewise, a clock which is held in the holdover section 66 is registered into the Priority selector 82 as a clock of the priority 5. The priority of a clock which is obtained when the PLL 64 is in a free-run state is not registered.

In the example illustrated in FIG. 27, at step S81, the PLL 64 is brought into the free-run state. Next, at step S82, it is judged whether an enabled clock is present and when any enabled clock is not present, the process returns to step S81. When the enabled clock is present, it is judged whether disconnection of the clock of the priority 1 (the reception clock which is received by the receiving interface 41a and is output from the Sync-E processing and clock disconnection detecting section 81) is detected at step S83. When disconnection of the clock is not detected, select information used to select the clock of the priority 1 is generated at step S84, changing of the state of the clock is waited at step S92 and the process proceeds to step S83.

In the case where disconnection of the clock of the priority 1 is detected at step S83, it is judged whether disconnection of the clock of the priority 2 is detected at step S85. In the case where disconnection of the clock concerned is not detected, select information used to select the clock of the priority 2 is generated at step S86, changing of the state of the clock is waited at step S92 and the process proceeds to step S83.

In the case where disconnection of the clock of the priority 2 is detected at step S85, it is judged whether disconnection of the clock of the priority 3 is detected at step S87. In the case where disconnection of the clock concerned is not detected, select information used to select the clock of the priority 3 is generated, changing of the state of the clock is waited at step S92 and the process proceeds to step S83.

In the case where disconnection of the clock of the priority 3 is detected at step S87, it is judged whether disconnection of the clock of the priority 4 is detected at step S89. In the case where disconnection of the clock concerned is not detected, select information used to select the clock of the priority 4 is generated and changing of the state of the clock is waited at step S92 and the process proceeds to step S83.

In the case where disconnection of the clock of the priority 4 is detected at step S89, select information used to select the clock of the priority 5 is generated at step S91, changing of the state of the clock is waited at step S92 and the process proceeds to step S83.

According to each of the above mentioned embodiments, in a state in which both the Sync-E function for extracting a clock from a transmission line and a function of extracting a clock from a PTP type transmission line in which a packet is used as a transmission medium are provided, a clock which is extracted from the PTP type transmission line is handled in the same manner as clocks which are extracted from other transmission line by giving respective pieces of quality information thereto and the clock of highest quality is selected from within the above mentioned candidates for clocks on the basis of the respective pieces of quality information and the current clock is switched to the clock of the highest quality. Owing to the above mentioned operations, even when a Sync-E non-correspondence node device is present in a network or when a fault has occurred in a transmission line or one of devices included in a network, it may become possible to maintain a clock-synchronized state in the network by using the above mentioned clock extracted from the transmission line PTP in which the packet is used as the transmission medium.

Owing to the provision of the function of periodically monitoring for a PTP packet, when any PTP packet does not arrive for a time period longer than a fixed time period, it may become possible to make the decision that the quality of the clock which has been extracted from the PTP type transmission line has been degraded.

It may become also possible to maintain the accuracy in time counting with which the time of each transmission device is counted by utilizing the device clock extracted from the transmission line also in counting up of the in-device clock even when the time-synchronizing function to be performed through the PTP type transmission line is disconnected.

In addition, low power consumption and size reduction may be more effectively promoted by using the holdover section included in the transmission device commonly by the device clock and the in-device clock.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A node device comprising:
    a first clock extracting section configured to extract a first clock from a first packet used for Precision Time Protocol (PTP) type synchronization, the first packet being a PTP type packet and being received from a network through a PTP type transmission line of a plurality of transmission lines in the network;
    a second clock extracting section configured to extract a second clock for Synchronous Ethernet (Sync-E) synchronization from a signal received from the network through a Sync-E transmission line of the plurality of transmission lines; and
    a clock selector to select a clock out of the first clock extracted by the first clock extracting section and the second clock extracted by the second clock extracting section,
    wherein the clock selected by the clock selector is used for synchronization of a third clock in the node device.

2. The node device according to claim 1, further comprising:
    a first packet clock quality information extracting section configured to extract clock quality information of the first packet from the first packet; and
    a transmission line clock quality information extracting section configured to extract clock quality information of the Sync-E transmission line from a second packet including clock quality information, the second packet being received from the network through the Sync-E transmission line,
    wherein the clock selector selects a clock out of the first clock extracted by the first clock extracting section and the second clock extracted by the second clock extracting section having a better quality, based on a comparison result of the extracted clock quality information of the first packet and the extracted clock quality information of the Sync-E transmission line.

3. The node device according to claim 2, wherein the clock selector includes:
    a converter to convert the extracted clock quality information of the first packet to clock quality information of the Sync-E transmission line;
    a clock quality selector to select a clock out of the first clock extracted by the first clock extracting section and the second clock extracted by the second clock extracting section having a better quality, based on a comparison result of the clock quality information extracted by the transmission line clock quality information extracting section and the clock quality information converted from the extracted clock quality information of the first packet by the converter.

4. The node device according to claim 3, further comprising:
    a period monitor of the first packet configured to monitor an arrival period of the first packet, and in a case where the arrival period of the first packet is more than a predetermined time, notify the clock quality selector of clock quality deterioration of the PTP-type transmission line.

5. The node device according to claim 1, wherein the clock selector selects a clock out of the first clock extracted by the first clock extracting section and the second clock extracted by the second clock extracting section, based on a priority preset in the first clock extracting section and the second clock extracting section.

6. The node device according to claim 2, further comprising:
a first packet selector to select one first packet out of a plurality of the first packets, based on a best master clock algorithm being taken to compare qualities of two PTP ports with each other to select one port which is superior in quality to the other port, so that the third clock is synchronized with time information of the selected first packet,
wherein the selected first packet is supplied to the first clock extracting section and the first packet clock quality information extracting section.

7. The node device according to claim 3, wherein the converter includes a table used to convert the clock quality information of the first packet to clock quality information of the Sycn-E transmission line.

8. The node device according to claim 6, wherein the clock selected by the clock selector is supplied to the third clock.

9. The node device according to claim 8, further comprising:
a holdover section configured to provide the clock selector with feedback on the clock that has been selected by the clock selector, in a case where there is no extracted clock in the first clock extracting section and the second clock extracting section,
wherein the clock output from the holdover section is supplied to the third clock.

10. A node device comprising:
means for extracting a clock from a first packet used for Precision Time Protocol (PTP) type synchronization, to thereby provide a first clock, the first packet being a PTP type packet and being received from a network through a PTP type transmission line of a plurality of transmission lines in the network;
means for extracting a clock for Synchronous Ethernet (Sync-E) synchronization from a signal received from the network through a Sync-E transmission line of the plurality of transmission lines, to thereby provide a second clock;
means for selecting one of the first clock and the second clock; and
means for using the selected one of the first clock and the second clock for synchronization of a third clock in the node device.

* * * * *

UNITED STATES PATENT AND TRADEMARK OFFICE
CERTIFICATE OF CORRECTION

PATENT NO. : 8,644,351 B2
APPLICATION NO. : 12/969662
DATED : February 4, 2014
INVENTOR(S) : Hamasaki et al.

It is certified that error appears in the above-identified patent and that said Letters Patent is hereby corrected as shown below:

In the Claims

Column 19, Line 19, In Claim 7, delete "Sycn-E" and insert -- Sync-E --, therefor.

Signed and Sealed this
Sixth Day of May, 2014

Michelle K. Lee
*Deputy Director of the United States Patent and Trademark Office*